US011157649B2

(12) United States Patent
Veeraragavan et al.

(10) Patent No.: US 11,157,649 B2
(45) Date of Patent: Oct. 26, 2021

(54) MANAGEMENT OF USER DATA DELETION REQUESTS

(71) Applicant: Schibsted Products & Technology AS, Oslo (NO)

(72) Inventors: Narasimha Raghavan Veeraragavan, London (GB); Karen Victoria Lees, London (GB); Sverre Sundsdal, London (GB)

(73) Assignee: Schibsted Products & Technology AS, Oslo (NO)

( * ) Notice: Subject to any disclaimer, the term of this patent is extended or adjusted under 35 U.S.C. 154(b) by 193 days.

(21) Appl. No.: 16/395,096

(22) Filed: Apr. 25, 2019

(65) Prior Publication Data

US 2019/0332800 A1 Oct. 31, 2019

(30) Foreign Application Priority Data

Apr. 26, 2018 (EP) .................................. 18169594

(51) Int. Cl.
*G06F 21/62* (2013.01)
*G06F 16/16* (2019.01)
*G06F 16/11* (2019.01)

(52) U.S. Cl.
CPC ........ *G06F 21/6245* (2013.01); *G06F 16/125* (2019.01); *G06F 16/162* (2019.01)

(58) Field of Classification Search
CPC ... G06F 21/6245; G06F 16/162; G06F 16/125
See application file for complete search history.

(56) References Cited

U.S. PATENT DOCUMENTS

| 2009/0193019 | A1* | 7/2009 | Hassan | G06Q 10/107 |
| 2012/0066177 | A1* | 3/2012 | Swanburg | H04M 3/53333 707/610 |
| 2014/0032600 | A1* | 1/2014 | Sarferaz | G06Q 10/06 707/781 |
| 2014/0047511 | A1* | 2/2014 | Wang | G06F 21/62 726/4 |
| 2014/0289875 | A1* | 9/2014 | Knafel | G06F 21/6245 726/33 |
| 2015/0234552 | A1* | 8/2015 | Ono | G06F 3/0483 715/739 |
| 2017/0186123 | A1* | 6/2017 | Shelton | H04L 63/10 |
| 2017/0372097 | A1* | 12/2017 | Smyth | G06Q 50/01 |

(Continued)

OTHER PUBLICATIONS

European Search Report dated Jul. 25, 2018, issued from the European Patent Office in related EP Application No. 18169594.1, (6 pages).

(Continued)

*Primary Examiner* — Vance M Little
(74) *Attorney, Agent, or Firm* — Harness, Dickey & Pierce, P.L.C.

(57) ABSTRACT

The present disclosure relates to systems, methods and computer programs for managing end user data deletion by communicating a prepare for deletion message to one or more two-step deletion subscriber entities to instruct them to prepare to enact a data deletion request, and communicate a deletion message to the one or more two-step target subscriber entities only after a ready for deletion message is received from each of the one or more two-step deletion subscriber entities.

15 Claims, 7 Drawing Sheets

(56) References Cited

U.S. PATENT DOCUMENTS

2018/0145840 A1\* 5/2018 Advani .................. H04L 51/32
2019/0156053 A1\* 5/2019 Vogel .................. G06F 21/6245

OTHER PUBLICATIONS

Raghavan Narasimha et al., "Privacy Broker: Message-Oriented Middleware to Implement Privacy Controls in Schibsted's Ecosystem of Services (Industry Article)" XP055491082, May 25, 2017, (7 pages).

\* cited by examiner

MANAGEMENT OF USER DATA DELETION REQUESTS

CROSS-REFERENCE TO RELATED APPLICATIONS

This application claims the benefit of European Application No. 18169594.1, filed Apr. 26, 2018. This application is incorporated herein by reference in its entirety to the extent consistent with the present application.

TECHNICAL FIELD

The present disclosure provides a system, method, apparatus and computer program for managing end user data deletion of a plurality of end users across a plurality of end user services.

BACKGROUND

When a company or entity provides services to end users, such as personalised content and/or targeted advertisements, it is usually necessary to collect a wide variety of datasets such as profile, behaviour, location, payment and communication messages about each end user. With the new EU General Data Protection Regulations (GDPR) 2018 scheduled to take effect from 25 May 2018, each user using the provided services has a "right to be forgotten". If a user submits a "right to be forgotten" request, or deletion request, to a company or entity, as part of GDPR 2018 the company or entity must honour the request.

However, an ecosystem of services provided by the company or entity may comprise a plurality, potentially hundreds, of independent services that have evolved organically over time, rather than forming a centralized top-down design. Properly managing data deletion across all services of the eco-system, for all users of the services, is a complex task. Furthermore, the services may be offered in a plurality of countries around the world, for example 30 countries, a number of which may have different requirements and/or legislation relating to user privacy. Furthermore, there may be a large number of users of the services offered by the company or entity, for example 200 million users/month, generating a large number of webpage views per month, for example 20 billion views/month, resulting in a large number of user service events, for example 700 million user events per day, and therefore a large volume of data.

Consequently, it can be seen that there is a need for a large scale, highly scalable, system that can reliably manage user deletion requests for a large, and potentially growing, end user base across a large, and potentially growing, ecosystem of services.

SUMMARY

In a first aspect of the present disclosure, there is provided a privacy broker system for managing end user data deletion across a plurality of end user services, the privacy broker system being configured to: receive a privacy event relating to an end user of the plurality of end users; communicate a prepare for deletion message to one or more two-step deletion target subscriber entities to instruct the one or more two-step deletion target subscriber entities to prepare to enact the data deletion request, wherein the prepare for deletion message comprises data for enabling the one or more two-step deletion target subscriber entities to obtain the privacy event; and communicate a deletion message to the one or more two-step deletion target subscriber entities only after a ready for deletion message is received from each of the one or more two-step deletion target subscriber entities; wherein each of the one or more two-step deletion target subscriber entities comprises a backend service entity for enacting the data deletion request.

The privacy broker system may be configured to determine the one or more two-step deletion target subscriber entities based at least in part on the privacy event.

The privacy event may comprise a user ID that uniquely identifies the end user; and a data deletion request that is indicative of the type of data deletion that the end user would like to take place. The user ID may comprise: a user-realm identifier that uniquely identifies a particular user realm in which the end user would like the data deletion to take place; and a user identification that is uniquely indicative of the end user within the particular user realm. The privacy broker system may be further configured to determine the one or more two-step deletion target subscriber entities based at least in part on the user realm identifier. The one or more two-step deletion target subscriber entities may comprise subscriber entities that have subscribed to data deletion requests that identify to the particular user realm.

The type of data deletion that the end user would like to take place may be a service level data deletion, wherein: the privacy event further comprises a service list indicative of one or more services within the particular user realm that the data deletion request is targeting, and wherein determination of the one or more two-step deletion target subscriber entities is further based at least in part on the service list, and wherein the one or more two-step deletion target subscriber entities comprises: one or more two-step deletion subscriber entities that have subscribed to data deletion requests that identify the particular user realm, and/or one or more two-step deletion subscriber entities that have subscribed to data deletion requests that identify at least one of the one or more services.

The type of data deletion that the end user would like to take place may be an event level deletion, wherein the data deletion request further comprises an event list indicative of one or more events within the particular user realm that the data deletion request is targeting.

The type of data deletion that the end user would like to take place may be an account level data deletion.

The privacy broker system may further comprise a broker database, wherein the privacy broker system is further configured to store in the broker database the privacy event and an associated progress status identifier that is indicative of progress towards the one or more two-step deletion target subscriber entities enacting the data deletion request.

The privacy broker system is further configured to: receive from a first target subscriber entity of the one or more two-step deletion target subscriber entities a completion notification indicative of the one or more two-step deletion target subscriber entities having successfully enacted the data deletion request; and set the progress status identifier associated with the privacy event in the broker database to indicate that the data deletion request has been enacted by the first target subscriber entity.

The privacy broker system may further comprise a user notification module configured to: when the progress status identifier associated with the privacy event in the broker database is set to indicate that the data deletion request has been enacted by all of the one or more two-step deletion target subscriber entities, communicate a confirmation of enactment to the end user.

The privacy broker system may further comprise a privacy compliance monitor. The privacy compliance monitor may be configured to: identify, using the progress status identifier in the broker database, a target subscriber entity of the one or more two-step deletion target subscriber entities for the privacy event that fails to meet a first enactment requirement; and upon identifying a target subscriber entity of the one or more two-step deletion target subscriber entities that fails to meet the first enactment requirement, re-communicate the deletion message to that target subscriber entity, wherein the first enactment requirement comprises a requirement that the one or more two-step deletion target subscriber entities enact the data deletion request within a first threshold period of time since the deletion message was most recently communicated to the one or more two-step deletion target subscriber entities.

The privacy compliance monitor may be further configured to: if the number of times the deletion message is re-communicated to a particular target subscriber entity of the one or more two-step deletion target subscriber entities exceeds a deletion message re-communication threshold, perform a first predetermined privacy event failure action.

The first predetermined privacy event failure action may comprise at least one of: communicate a failure alert to an entity responsible for the particular target subscriber entity; and/or set the progress status identifier associated with the privacy event in the broker database to indicate that the particular target subscriber entity has failed to enact the data deletion request.

Additionally or alternatively, the privacy compliance monitor may be configured to: identify, using the progress status identifier in the broker database, a target subscriber entity of the one or more two-step deletion target subscriber entities that fails to meet a second enactment requirement; and upon identifying a target subscriber entity of the one or more two-step deletion target subscriber entities that fails to meet the second enactment requirement, re-communicate the prepare for deletion message to that target subscriber entity, wherein the second enactment requirement comprises a requirement that the one or more two-step deletion target subscriber entities respond to the prepare for deletion message with a ready for deletion message within a second threshold period of time since the prepare for deletion message was most recently communicated to the one or more two-step deletion target subscriber entities.

The privacy compliance monitor may be further configured to: if the number of times the prepare for deletion message is re-communicated to a particular target subscriber entity of the one or more two-step deletion target subscriber entities exceeds a prepare for deletion message re-communication threshold, perform a second predetermined privacy event failure action.

The second predetermined privacy event failure action may comprise at least one of: communicate a failure alert to an entity responsible for the particular target subscriber entity; and/or set the progress status identifier associated with the privacy event in the broker database to indicate that the particular target subscriber entity has failed to respond to the prepare for deletion message.

The privacy broker system may further comprise a plurality of broker workers configured to receive a worker request relating to the privacy event; communicate the prepare for deletion message to the one or more two-step deletion subscriber entities; determine whether or not all of the one or more two-step target subscriber entities have communicated a ready for deletion message; and if all of the one or more two-step target subscriber entities have communicated a ready for deletion message, communicate a deletion message to the one or more two-step deletion subscriber entities. By implementing a plurality of privacy broker workers in this way, multiple privacy events may be dealt with by different privacy workers in parallel, thereby improving the speed of processing of privacy events and improving the scalability of the system.

In a second aspect of the present disclosure, there is provided a method for managing end user data deletion across a plurality of end user services, the method comprising: receiving a privacy event relating to an end user of the plurality of end users; communicating a prepare for deletion message to one or more two-step deletion subscriber entities to instruct the one or more two-step deletion subscriber entities to prepare to enact the data deletion request, wherein the prepare for deletion message comprises data for enabling the one or more two-step deletion subscriber entities to obtain the privacy event; and communicating a deletion message to the one or more two-step target subscriber entities only after a ready for deletion message is received from each of the one or more two-step deletion subscriber entities, wherein each of the one or more target subscriber entities comprises a backend service entity for enacting the data deletion request.

In a third aspect of the present disclosure, there is provided a computer program configured to perform the method of the second aspect, when executed on a processor of an electronic device.

In a fourth aspect of the present disclosure, there is provided an electronic device comprising: a processor; and a memory storing a software program, wherein the software program, when executed by the processor, causes the processor to perform the method of the second aspect.

In a fifth aspect of the present disclosure, there is provided a two-step deletion subscriber entity comprising a backend service for providing an end user service and for enacting an end user data deletion request, the backend service entity being configured to: receive from a privacy broker system a prepare for deletion message relating to an end user data deletion request; prepare to enact the data deletion request; after preparations for enacting the data deletion request are complete, communicate a ready for deletion message to the privacy broker system; and after receipt of a deletion message from the privacy broker system, enact the data deletion request.

Preparing to enact the data deletion request may comprise gathering data relating to the end user that are to be retained, wherein the backend service entity is further configured to store the gathered data that are to be retained.

Gathering data relating to the end user that are to be retained may comprise gathering data from one or more related backend services.

The backend service entity may comprise data retention settings indicative of types of end user data that are to be retained, wherein preparing to enact the data deletion request is based at least in part on the data retention settings.

The backend service entity may be further configured to: after successfully enacting the data deletion request, communicate a completion notification to the privacy broker system, wherein the completion notification is indicative of the subscriber entity having successfully enacted the data deletion request.

In a sixth aspect of the present disclosure, there is provided a method for enacting an end user data deletion request, the method comprising: receiving from a privacy broker system a prepare for deletion message relating to an end user data deletion request; preparing to enact the data deletion request; after preparations for enacting the data deletion request are complete, communicating a ready for deletion message to the privacy broker system; and after receipt of a deletion message from the privacy broker system, enacting the data deletion request.

In a seventh aspect of the present disclosure, there is provided a computer program configured to perform the method of the sixth aspect, when executed on a processor of an electronic device.

In an eighth aspect of the present disclosure, there is provided an electronic device comprising: at least one processor; and a memory storing a software program, wherein the software program, when executed by the processor, causes the processor to perform the method of the sixth aspect.

In a ninth aspect of the present disclosure, there is provided a privacy broker system for managing end user data takeout across a plurality of end user services, the privacy broker system comprising: a data collection database for receiving user data from one or more target subscriber entities, the privacy broker system being configured to: communicate a data takeout message to the one or more target subscriber entities to instruct the one or more target subscriber entities to enact a data takeout request relating to an end user of the plurality of end users; receive, at the data collection database, user data relating to the end user from at least some of the one or more target subscriber entities; aggregate the received user data; and make the aggregated user data available for download by the end user; wherein each of the one or more target subscriber entities comprises a backend service entity for enacting the data takeout request.

The privacy broker system may be further configured to: receive a privacy event relating to an end user of the plurality of end users, the privacy event comprising at least: a user ID that uniquely identifies the end user, and the data takeout request; and determine, based on at least part of the received privacy event, the one or more target subscriber entities.

The data takeout message may comprise the user ID and the data takeout request.

The privacy broker system may be further configured to: aggregate the received user data only after receiving a completion notification from each of the one or more target subscriber entities, wherein each completion notification confirms that the respective target subscriber entity has either: a) uploaded to the data collection database their user data relating to the end user, or b) does not have any user data relating to the end user.

Upload only access to the data collection database may be allowed for the one or more target subscriber entities. The privacy broker system may be further configured to communicate at least one address to each of the one or more target subscriber entities to enable upload only access to the data collection database. A different address may be communicated to each of the one or more target subscriber entities such that each target subscriber entity has upload only access to a different addresses of the data collection database.

The privacy broker system may be further configured to communicate a secure download address to the end user to enable the end user to securely download the end user data from the user archive database. The secure download address may be valid for only a first period of time after generation of the secure download address.

The privacy broker system may further comprise a user archive database, the system being further configured to: aggregate in the user archive database the user data received at the data collection database; and make the received user data available for download by the end user from the user archive database.

The privacy broker system may be configured to delete the end user data from the user archive database when a second period of time has elapsed since the user data was aggregated in the user archive database.

The privacy broker system may be configured to delete the user data from the data collection database when one of the following conditions is met: a) the user data in the data collection database has been aggregated in the user archive database; b) a third period of time has elapsed since the user data was received at the data collection database.

The privacy broker system may further comprise: a broker database, wherein the privacy broker system is further configured to store in the broker database the privacy event and an associated progress status identifier that is indicative of progress towards the one or more target subscriber entities enacting data takeout.

The privacy broker system may be further configured to: receive from a first target subscriber entity of the one or more target subscriber entities an upload completion notification indicative of the first target subscriber entity having successfully uploaded user data to the data collection database; and set the progress status identifier associated with the privacy event in the broker database to indicate that the data takeout request has been enacted by the first target subscriber entity.

The privacy broker system may further comprise a privacy compliance monitor.

The privacy compliance monitor may be configured to: identify, using the progress status identifier in the broker database, a target subscriber entity of the one or more target subscriber entities for the privacy event that fails to meet a first enactment requirement; and upon identifying a target subscriber entity of the one or more target subscriber entities that fails to meet the first enactment requirement, re-communicate the data takeout message to that target subscriber entity, wherein the first enactment requirement comprises a requirement that the one or more target subscriber entities enact the data takeout request within a first threshold period of time since the data takeout message was most recently communicated to the one or more target subscriber entities.

The privacy compliance monitor may be further configured to: if the number of times the data takeout message is re-communicated to a particular target subscriber entity of the one or more target subscriber entities exceeds a data takeout message re-communication threshold, perform a first predetermined privacy event failure action.

The first predetermined privacy event failure action may comprise at least one of: communicate a failure alert to an entity responsible for the particular target subscriber entity; and/or set the progress status identifier associated with the privacy event in the broker database to indicate that the particular target subscriber entity has failed to enact the data takeout request.

The privacy broker system may further comprise a plurality of broker workers configured to receive a worker request relating to the privacy event; communicate the data takeout message to the one or more two-step deletion subscriber entities and determine whether or not all of the target subscriber entities have uploaded their user data. By implementing a plurality of privacy broker workers in this way, multiple privacy events may be dealt with by different privacy workers in parallel, thereby improving the speed of processing of privacy events and improving the scalability of the system.

In a tenth aspect of the present disclosure, there is provided a method for managing end user data takeout across a plurality of end user services, the method comprising: communicating a data takeout message to one or more target subscriber entities to instruct the one or more target subscriber entities to enact a data takeout request relating to an end user of the plurality of end users; receiving, at a data collection database, user data relating to the end user from at least some of the one or more target subscriber entities; and aggregating the received user data; and making the aggregated user data available for download by the end user; wherein each of the one or more target subscriber entities comprises a backend service entity for enacting the data takeout request.

In an eleventh aspect of the present disclosure, there is provided a computer program configured to perform the method of the tenth aspect, when executed on a processor of an electronic device.

In a twelfth aspect of the present disclosure, there is provided an electronic device comprising: a processor; and a memory storing a software program, wherein the software program, when executed by the processor, causes the processor to perform the method of the tenth aspect.

DRAWINGS

Aspects of the disclosure are described, by way of example only, with reference to the following drawings, in which.

DETAILED DESCRIPTION

The present disclosure provides a privacy broker system that is based on a centralized topic pub/sub style of middleware that enables the management of end user data deletion requests across an ecosystem of services. When the privacy broker system receives, via a front-end service, a privacy event from an end user comprising a data deletion request, the privacy broker system can communicate the privacy event out to backend services to enact the requested data deletion, based on the pub/sub model. By configuring the privacy broker system to utilise a pub/sub style approach in this new and unexpected way, large scale data deletion can be reliably achieved. The system is also highly scalable, as new front-end and backend services can straightforwardly by added by registering additional publisher entities and subscriber entities. Furthermore, privacy controls may be reliably implemented across an entire ecosystem of services since a user's privacy event trigger from the front-end of one particular service can be forwarded to, and enacted by, backend services relating to a whole host of services who should be enacting that privacy event. The privacy broker system can be configured to monitor the progress of enacting the data deletion requests and take any necessary action to improve the prospects of the data deletion requests being properly enacted and to notify end users when their privacy requests have been enacted.

Furthermore, backend services can subscribe as a two-step deletion subscriber entity so that they will receive warning of the data deletion request before they must enact it. This may be very useful for backend services that need to store or archive particular user data for legal reasons, even when the end user has exercised their right to data deletion, particularly where the backend service has dependencies on other services who are holding the data that needs to be archived. In these instances, the privacy broker system may first issue a prepare for deletion message to each of the two-step deletion subscriber entities so that they can gather and archive data as necessary in order to prepare for the deletion. Only after all of the two-step deletion subscriber entities have signalled their readiness are the subscriber entities instructed by the privacy broker system to enact the deletion. Consequently, backend services are given time to gather and archive data as necessary according to their legal requirements before that data is deleted, without requiring the privacy broker to keep complex dependency graphs between backend services, which can be very difficult and technically inefficient to obtain and accurately maintain. Therefore data deletion may be achieved more accurately and reliably with reduced technical complexity, and therefore greater efficiency.

I. Service Layerings of Ecosystem

Figure 1:
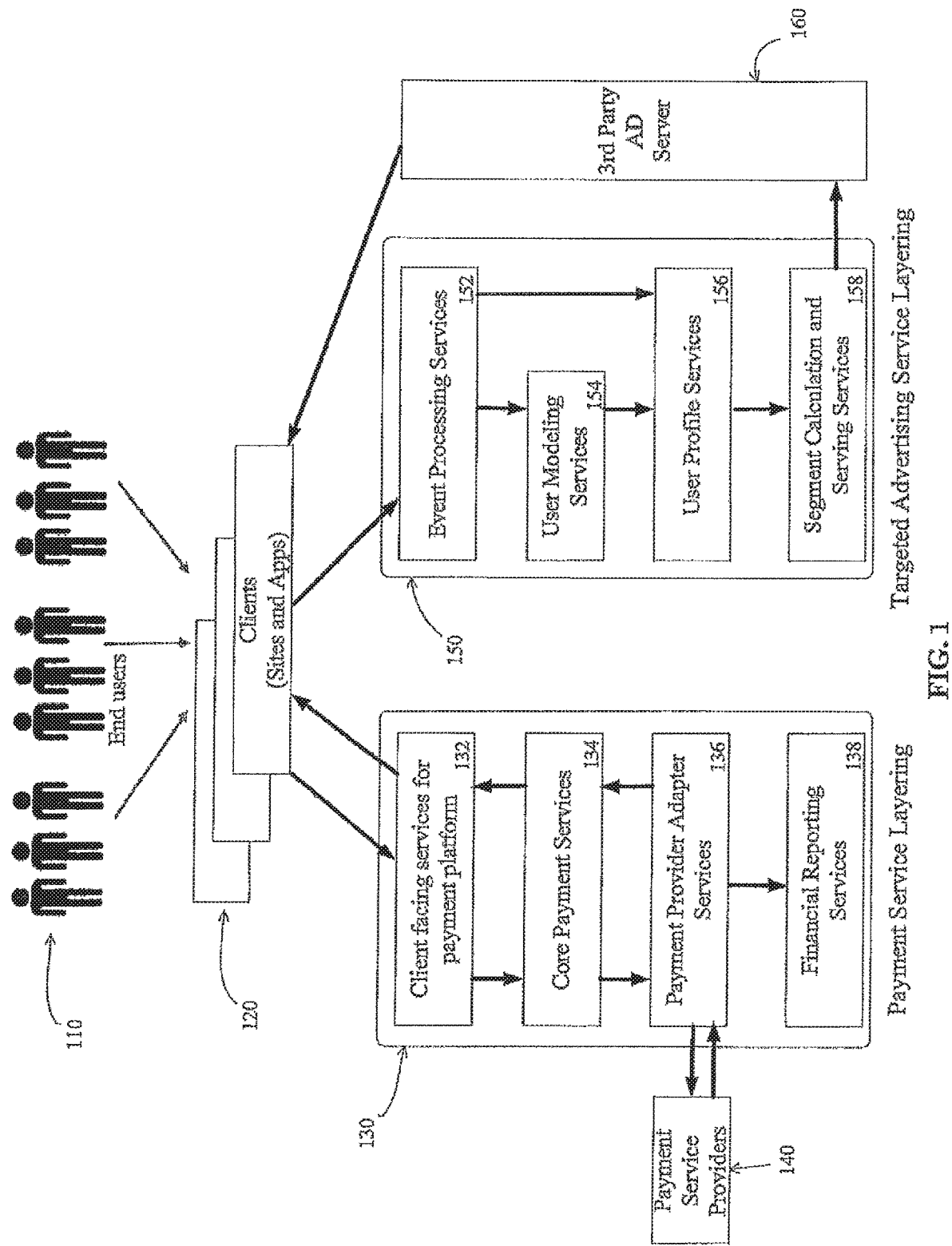
FIG. 1 shows a schematic representation of service layering patterning of a services ecosystem.

FIG. 1 shows an example representation of a service layering patterning of a services ecosystem. The ecosystem comprises a payment service layering 130 for providing an end-user payment service, and a targeted advertising service layering 150 for providing an end-user targeted advertising service. It will be appreciated that these are merely two example types of services and that the services ecosystem may additionally or alternatively comprise one or more other service layerings for providing any other end user services.

Furthermore, whilst FIG. 1 shows only two services for the sake of clarity, in practice there may be many more independent services, for example tens or even several hundreds of independent services, each with their own service layering. Each of these services may have evolved organically rather than by centralized top-down design and due to the organic nature, these services may work together as many layers of dependencies rather than strict tiers (hierarchical) as used in traditional large scale system design.

Every service may have an owner (a team) responsible for creating, operating, maintaining and deprecating the service. The owner may be any entity that is responsible for the service. Every service owner is responsible for knowing their clients and also their dependencies on, or relationships with, other services. Additionally, service owners may justify the existence of their services through its usage and business value.

An emergent property of services ecosystems is neat service layering, wherein the services are organized in logical layers of functionality depending upon the scenarios.

The payment service layering 130 is responsible for payment transactions of end users 110. As the entry point to the payment service layer 130, the client facing services for payment platform layer 132 contains a set of services that handles all the incoming traffic to the payment platform, performs authorization and authentication of end users, and delegates invocations to downstream services. The core payment service layer 134 has a bunch of services that handles all payment related operations such as authorize, cancel, capture, reverse, get, search, etc. Furthermore, after executing all the necessary steps in the core layer, the call is passed to the next layer of pre-processing payment adapter services wherein the appropriate pre-processing payment provider adapter services layer 136 is used to have request/reply type of communication to a corresponding payment service provider 140. All these communications are passed to the financial reporting services layer 138 for financial reporting and tracking reasons.

The targeted advertising service layering 150 is responsible for providing targeted advertisements to end users 110 based on their interests and/or demographic information. When the end users 110 visit a services ecosystem client 120 (for example, a site or app), behavioural and/or location events may be generated and sent to the event processing service layer 152, which processes these events and passes the behavioural events to the user modelling services layer 154 which predicts the characteristics of end users 110. These characteristics, along with the location events from the event processing services layer 152, are used to generate the profiles for the anonymous users and complete the profile for identified end users with the help of the user profile services layer 156. The input from the user profile services layer 156 is used by the segment calculation and servicing services layer 158 to calculate the appropriate ad segment for an end user. The calculated segment is served to the 3rd party ad provider 160 for communicating to the end user.

For a privacy request to be properly implemented in the ecosystem of services, it may be important to map the corresponding service layerings that are affected by the privacy request so that it can be fulfilled properly. For example, an end user may wish to delete data for an entire user account, which may encompass a number of different services spread across different service layerings. Likewise, an end user may wish to delete data for only a particular service, which should not affect the end user's data held by other unrelated services.

An observation from the above scenarios is that in some instances several services may be affected based on a single end user privacy request. Based on this realisation, the present disclosure provides a centralized platform to map privacy requests to the relevant services and track these requests to make sure that the user requests are enacted in the system.

Furthermore, for data deletion requests, it has been recognised that some services may be under a legal requirement to archive user data before proceeding with its deletion. For example, the payment service layering 130 may be legally obliged to maintain an archive of end user transactions, even when the end user has requested deletion of data relating to the payment service. This may be even further complicated by the fact that some services may have dependencies on, or relationships with, other services, and some of the end user data that needs to be archived is held by those other services. In those cases, a service's enactment of a data deletion request may be dependent on one or more related services.

It may be unworkable in these cases for the centralized platform to maintain a dependency graph for each service, since those dependencies can be complex and regularly changing. Instead, the present disclosure provides a centralized platform that maps data deletion requests to relevant services, who may subscribe to the centralized platform to receive a warning of a data deletion request before it must actually be enacted. In this way, those services may maintain their own dependency graph and prepare for the data deletion as necessary. Once preparations are complete, the subscribing service may signal this to the centralized platform, which may then instruct all relevant subscribing services to enact the deletion when all have signalled that they are ready. In this way, services may be given time to prepare properly for the deletion to ensure that all of their archiving requirements are taken care of before the data is deleted. Consequently, a situation can be avoided where one service with legal archiving obligations tries to gather data held by a related or dependent service after that related or dependent service has already enacted the data deletion request. Thus, the services may know that it's safe to delete their data without the centralized platform having to maintain a full dependency graph for all services.

The rest of this disclosure is organized as follows: Section II briefly explains the architecture of the privacy broker system according to an aspect of the present disclosure, which is a centralized publish/subscribe style middleware towards managing the end user data deletion requests. Then, we discuss in Sections III and IV example operations of the privacy broker system for data deletion requests and data takeout requests.

II. Architecture of Privacy Broker System

In this section, we describe examples of technical architecture of the privacy broker system of the present disclosure. The privacy broker system facilitates the interaction between the different services towards honouring end users' privacy choices. The communication paradigm of the architecture is loosely based on a publish/subscribe (pub/sub) model, wherein each topic of the pub/sub model represents an end user privacy control.

However, supporting end user privacy controls in a services ecosystem such as that represented in FIG. 1 may require a specific set of requirements and constraints to be met. For example, real-time performance may be less critical (since from a legal perspective there is generally some time to honour privacy requests) in comparison to the reliability and consistency of enacting the privacy request. Moreover, the communication mode required by each backend service may be different and each service may have different configuration parameters that need to be supported by the centralized publish/subscribe system.

Additionally, it may be necessary to keep track of all services involved per privacy event in order to ensure the completeness of the privacy operations associated with that event.

II.1 First Example Privacy Broker System 210

Figure 2:
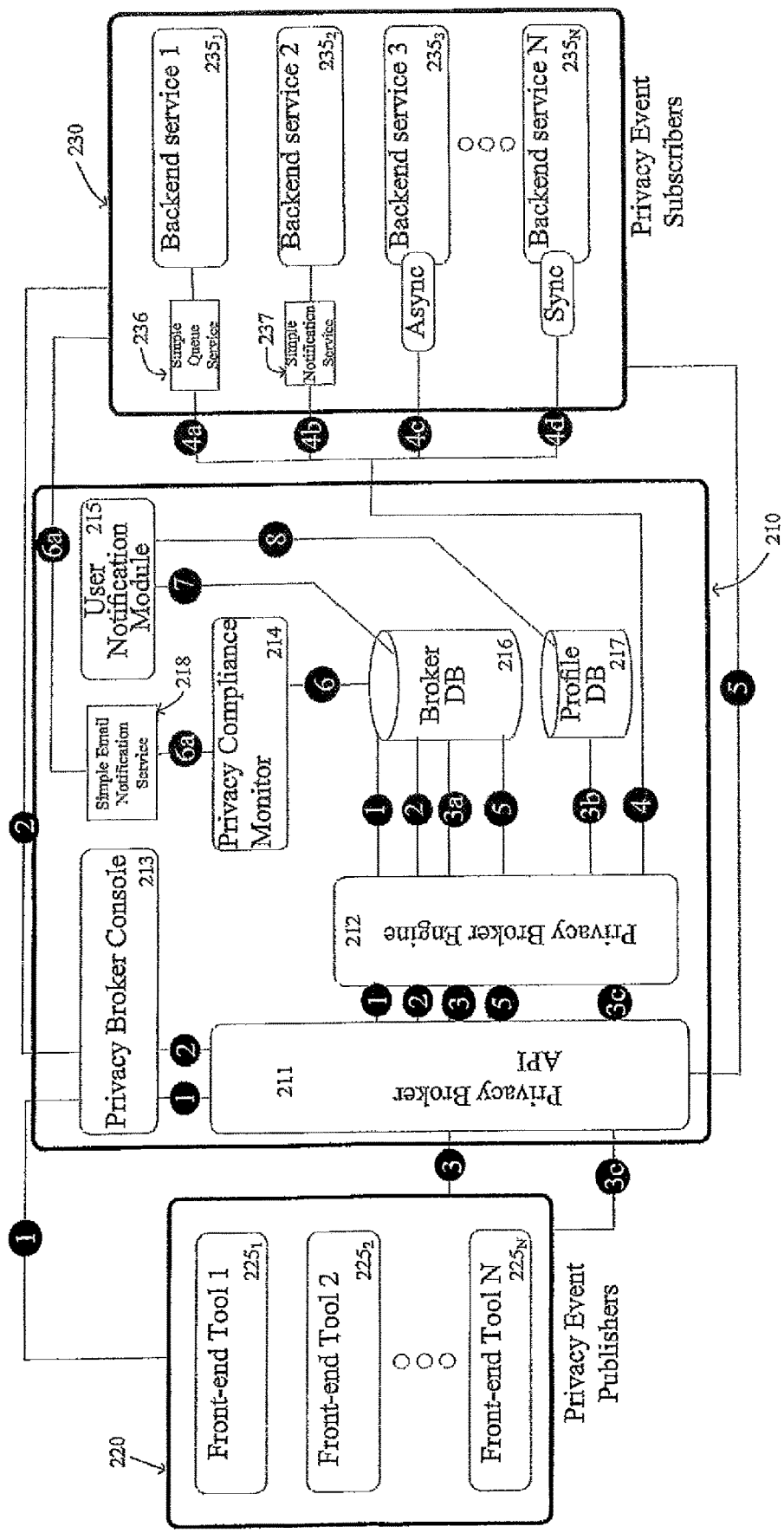
FIG. 2 shows a schematic representation of a privacy broker system in accordance with a first aspect of the present disclosure.

FIG. 2 shows a representation of a first example privacy broker system 210 in accordance with an aspect of the present disclosure. Interfacing with the privacy broker system 210 at one end are the privacy event publishers 220, which comprise front-end tools $225_n$ (FIG. 2 shows a representation of front-end tool 1 $225_1$, front-end tool 2 $225_2$ and front-end tool N $225_N$. It will be appreciated, however, this is merely one example and the privacy event publishers 220 may comprise any number of front-end tools, for example one or more front-end tools). The front-end tools $225_n$ may generate the privacy signals or privacy events for exercising end user privacy controls, for example a privacy event relating to an opt out of targeted advertising. Further details of the privacy event publishers 220 are given below in the section 'A. Privacy Event Publishers and Privacy Event Subscribers'.

Interfacing with the privacy broker system 210 at the other end are the privacy event subscribers 230, which comprise backend services $235_n$ (FIG. 2 shows a representation of backend service 1 $235_1$, backend service 2 $235_2$, backend service 3 $235_3$ and a backend service N $235_N$. It will be appreciated, however, this is merely one example and the privacy event subscribers 230 may comprise any number of backend services, for example one or more backend services). Further details of the privacy event subscribers 230 are given below in the section 'A. Privacy Event Publishers and Privacy Event Subscribers'.

As explained in more detail below, the privacy broker system 210 is configured to route privacy signalling from the privacy event publishers 220 to the appropriate privacy event subscribers 230. Furthermore, it may also be configured to track the status of the privacy event subscribers 230 with respect to honouring the users' privacy choices.

The high-level privacy broker system 210 represented in FIG. 2 comprises five core components: a) Privacy Broker API 211, b) Privacy Broker Engine 212, c) Privacy Broker Console 213, d) Privacy Compliance Monitor 214 and e) User Notification Module 215. Further details of these components are given below in sections B to F. The privacy broker system 210 represented in FIG. 2 also comprises a Broker Database 216, a Profile Database 217 and a Simple Notification Service Module 218.

A. Publishers and Subscribers

Each of the backend services $235_n$ may be a service within an ecosystem of services (for example, one of the service layerings, or one or more service layers within a service layering, represented in FIG. 1). The backend services $235_n$ are configured to enact privacy requests of end users, such as a data deletion request or a data takeout request, so that those privacy requests are honoured.

The front-end tools $225_n$ are various end user facing front-end tools of end user services that are available at clients (for example, sites and apps) 120, potentially in several countries across the world. These front-end tools $225_n$ may provide customized privacy controls to the end users 110, optionally based on the geographical region and the nature of the digital products to which they relate.

For example, the privacy controls offered on front-end tools $225_n$ for newspaper sites may be different to those on dating sites, due to the inherent nature of content of these two sites.

Furthermore, even though the GDPR will imply more similar privacy rules across Europe, there may still be room for some interpretations by national regulators that should be taken into account. For example, the general GDPR rule is that processing of data about individuals younger than age 16 should not proceed without parental consent. However, the regulation may leave room for the countries implementing the GDPR in their national laws to set the bar as low as 13 instead.

In addition to the age factor, other differences between geographical areas may include the following areas,
Deletion: When is data sufficiently deleted?
Security Measures: What measures need to be in place in order for security to be at a sufficient level?

Moreover, countries outside Europe may have different regulations. Thus, the privacy controls offered to end users by the front-end tools $225_n$ may need to vary depending on the geographical location or region of the end user and/or the geographical location or region of the service offered to the end user. Additionally or alternatively, the privacy controls offered to end users by the front-end tools $225_n$ may need to vary depending on the nature of the digital products to which the front-end tool $225_n$ relates.

The privacy event publishers 220 may generate privacy events whenever end users use privacy controls. Each privacy event corresponds to a topic in a pub/sub model. The privacy event publishers 220 can register the topic via the privacy broker console 213.

The backend services $235_n$ may be the various backend services that are part of one or more service layerings of a services ecosystem, as described earlier with reference to FIG. 1. Each of the back end services $235_n$ may be a service or a group of services. The backend services $235_n$ subscribe to the available topics via the privacy broker console 213. After one or more of the back end services $235_n$ receive the appropriate privacy events from the privacy broker system 210, they make appropriate changes to their services towards honouring the end users' privacy choices and may notify the completion of changes back to the privacy broker system 210 using the privacy broker API 211 (interface #5 in FIG. 2).

B. Privacy Broker Console 213

The main design goal of the broker console 213 is to be a self-service portal for the privacy event publishers 220 and the privacy event subscribers 230 to configure the privacy broker system 210 towards enabling the end user privacy controls in the ecosystem of services.

The privacy broker console 213 may be used by the privacy event publishers 220 and the privacy event subscribers 230 to register to the privacy broker system 210.

The privacy broker console 213 may be configured to be accessible only to the developers within the ecosystem of services (for example, developers employed by, or associated with, the company (or companies) that are responsible for the ecosystem of services). The common functionalities of the privacy broker console 213 may include at least one of:

Registration of new privacy event publishers 220 (for example, new front-end tools $225_n$) and/or of new privacy event subscribers 230 (for example, new back-end services $235_n$)

Registration of new privacy controls for a privacy event publisher 220

Update of privacy broker system 210 configurations for privacy event publishers 220 and/or privacy event subscribers 230

Deletion of privacy event publishers 220 and/or privacy event subscribers 230

Communications relating to the configurations of privacy event publishers 220 and privacy event subscribers 230 to the privacy broker system 210 may happen via the privacy broker console 213 (interface #1 and #2 in FIG. 2). Additionally, all the configuration details given by the privacy event publishers 220 and privacy event subscribers 230 may be validated in the privacy broker engine 212 and optionally then persisted in the broker database 216. If there are any incorrect configuration details detected by the privacy broker engine 212, then appropriate error messages may be shown to the corresponding privacy event publishers 220 or privacy event subscribers 230.

The configuration parameters for privacy event publishers 220 and privacy event subscribers 230 that may be stored in the broker database 216 via the privacy broker API 211 are described in Table I, which is set out in the section 'Tables' which follows this detailed description. Example configurations of the privacy event publishers 220 and the privacy event subscribers 230 stored in the broker database 216 are shown in Table II and Table III respectively.

It can be seen from Table III and FIG. 2 that each of the represented backend services $235_n$ has a different mode of communication (subscription type). In particular, backend service 1 $235_1$ has an Amazon® Simple Queue Service (SQS) mode of communication via the SQS module 236, backend service 2 $235_2$ has an Amazon® Simple Notification Service (SNS) mode of communication via the SNS module 237, backend service 3 $235_3$ has an asynchronous API call mode of communication and backend service N $235_N$ has a synchronous API call mode of communication. However, these are merely non-limiting examples and each of the backend services $235_n$ may have any suitable mode of communication. It may therefore be appreciated that by implementing a pub/sub style the privacy broker system 210 that matches privacy events to target subscriber entities and then communicates the privacy events to those targets, heterogeneous communication endpoints (for example, API, SQS, SNS) may be supported for the backend services 230.

C. Privacy Broker API 211

The main design goal for the privacy broker API 211 is to provide endpoints for the privacy event publishers 220, the privacy event subscribers 230 and the privacy broker console 213 to interact with the privacy broker engine 212.

The privacy broker API 211 may be mostly used by the privacy event publishers 220 (such as the front-end tools $225_n$ that display privacy settings to the end users) to publish the privacy events and by the privacy event subscribers 230 to send completion messages after they honour the end users' privacy choices.

The communications of the privacy event publishers 220 and the privacy event subscribers 230 to the privacy broker API 211 endpoints may be guarded with the help of Software Development Kits (SDKs). SDKs may ensure the communication from the broker clients (the privacy event publishers 220 and privacy event subscribers 230) are happening in a consistent (all clients using same protocols and messaging format), secure (all clients are authenticated and authorized) and reliable way (number of retries in case of not able to reach the broker). Privacy event subscriber SDKs may be responsible for sending a synchronous status notification that indicates the current status of progress towards honouring the end users' privacy choices.

The SDKs may use the gRPC protocol to communicate with the privacy event publishers 220 (although any other suitable protocol may alternatively be used) and the privacy event subscribers 230 may use protocol buffer as the messaging format (although any other suitable messaging format may alternatively be used).

D. Privacy Broker Engine 212

The privacy broker engine 212 is responsible for routing the privacy events from privacy event publishers 220 to the privacy event subscribers 230.

The purposes of the privacy broker engine 212 are the following:

Match the incoming privacy events from privacy event publishers 220 to appropriate privacy event subscribers 230.

Disseminate the privacy events from the privacy event publishers 220 to the privacy event subscribers 230.

The privacy broker engine 212 may optionally also process the incoming communications from broker clients (such as the privacy event publishers 220 and the privacy event subscribers 230) and update the privacy broker system 210 configuration and/or user profile database 217 accordingly.

1) Processing Logic for the Communications Coming Via the Privacy Event Console 213:

Developers from Publisher (for example, front-end tools $225_n$) and/or Subscriber (for example, backend services $235_n$) teams may provide configuration parameters via the privacy broker console 213 to the privacy broker system 210 (interfaces #1 and #2 in FIG. 2). The parameters of configuration may be validated with the help of corresponding configuration schemas and with routine input validation. After validation, the broker configuration database (broker DB 216) may be updated. Example privacy event publisher 220 and privacy event subscriber 230 configurations stored in the broker database 216 are shown in Table II and Table III.

2) Processing Logic for the Privacy Events Coming from Privacy Event Publishers 220:

Privacy events may be communicated from a front-end tool 225 to the privacy broker engine 212 via the privacy broker API 211 (interface #3 in FIG. 2). Privacy events may comprise a unique identifier of the end user (User ID) and a privacy request relating to an end user privacy control, for example a data deletion request or a data takeout request. The privacy request relates to a particular user, or individual, so the inventors have realised that the User ID should uniquely identify the particular, individual user to which the privacy request relates. The privacy broker engine 212 may determine one or more privacy event subscribers $235_n$ based on the privacy request and notify those one or more privacy event subscribers $235_n$ of the privacy event (explained in more detail below, in section '4 Disseminating the privacy events to the appropriate privacy event subscribers' and in the 'III. Data deletion process' and 'IV. Data takeout process' sections). Optionally, the privacy broker engine 212 may also store the privacy event in the broker database 216 (interface #3a in FIG. 2). By storing the privacy event in the broker database 216, the privacy broker engine 212 may also track the progress of the privacy event subscribers 230 towards honouring the end users' privacy choices.

Table IV shows an example privacy events table in the broker database 216. The 'Event ID' may be any form of unique identifier of the privacy event. The 'publisher ID' may be any form of unique identifier of the publisher from which the privacy event was received (for example, from which front-end tool $225_n$ the privacy event was received). The 'unique user ID' may be any form of unique identifier of the end user relating to the privacy request.

The 'request topic type' is indicative of the privacy request relating to the end user (for example, a request for account data deletion, or a request for event data deletion, or a request for data takeout, etc).

The 'request status' offers various status options that can be used to track the status of the privacy request. Some examples of potential request statuses for privacy events are identified in Table IV. These request statuses, and others, are explained in more detail in Table V.

Furthermore, optionally a privacy event publisher may be notified that their privacy event will be eventually honoured as soon as the privacy event is written in the broker database 216 (interface #3c in FIG. 2). This in turn may be helpful to enable the privacy event publisher to display appropriate information to the end users.

3) Matching the Privacy Events with Privacy Event Subscribers 230:

For each received privacy event (for example, those shown in Table IV), one or more privacy event subscribers 230 (backend services 235$_n$) relevant to the privacy event (for example, one or more target subscribers) may be determined. The way in which the one or more target subscribers are determined may depend on the type of privacy request in the privacy event and is explained in more detail later in the 'III. Data deletion process' and 'IV. Data takeout process' sections.

With the target list of privacy event subscribers 230 for a privacy event, the privacy broker engine 212 may create and store in the broker database 216 a subscription notification progress table as shown in the Table VI. The default status for the 'progress status' may be INIT for a newly stored privacy event. Examples of various progress status options that may be set in the subscription notification progress table and the corresponding definitions are given in the Table VII.

4) Disseminating the Privacy Events to the Appropriate Privacy Event Subscribers 230:

Once the target subscriber entities have been determined, the privacy broker engine 212 communicates a message relating to the privacy event to all target subscriber entities (interfaces #4, #4a, #4b, #4c and #4d in FIG. 2). It can be seen that in the example of Table VI, for the privacy event identified by Event ID 123442, there are two target subscribers (Subscriber IDs 12344, 12349), so messages relating to the privacy event should be communicated to both of them. More details relating to these messages are explained later in the 'III. Data deletion process' and 'IV. Data takeout process' sections.

The privacy broker engine 212 may also update the statuses for each privacy event in Table VI and in Table IV. Furthermore, when each of the one or more target subscriber entities 230 sends acknowledgement signals and/or completion signals (via interface #5 in FIG. 2) back to the privacy broker system 210, then the privacy broker engine 212 may update the progress status in Table VI as appropriate. Further details of this process are described in more detail later in the 'III. Data deletion process' and 'IV. Data takeout process' sections.

If the broker database 216 has COMPLETED status from all the privacy event subscribers 230 for a privacy event, then the privacy broker engine 212 may update the request status field of Privacy Event Requests Table IV to COMPLETED.

Thus, the value set for the 'progress status' can be indicative of progress towards the one or more privacy event subscribers 230 enacting the privacy request. Some examples of potential request statuses for privacy events are identified in Table IV. These request statuses, and others, are explained in more detail in Table V.

E. Privacy Compliance Monitor 214

The privacy compliance monitor 214 is responsible for tracking the statuses of the privacy event subscribers 230 towards enacting the privacy requests and therefore honouring the end users' privacy choices.

The privacy compliance monitor 214 may monitor the status column in Table VI and, optionally with the help of Table III, it may scan for the messages communicated to target subscriber entities that have not been acted on by the target subscriber entities within the expected time (the 'time to act' in Table III and Table VI). In this way, it may identify, using the values set for the 'progress status' (i.e., the progress status identifiers) and 'time to act' in Table VI, any privacy subscriber entities 230 to whom a message was communicated, but who has not acted on the message within a threshold period of time. On identifying a privacy event subscriber that has not acted on a message within the threshold period of time, it may re-communicate the message to the privacy event subscriber. In this way, the privacy event subscribers 230 will be allowed the threshold period of time from when the message is most recently communicated to them to act on the message. In the examples shown in Tables III and VI, the threshold period of time is typically 1 day ('time to act'), although it may alternatively be set to any suitable value. Optionally, one or more privacy event subscribers 230 may change or update their 'time to act' via the privacy broker console 213 (using interface #2 in FIG. 2), for example in view of some technical failure or upgrade in their system.

The privacy compliance monitor 214 may be further configured to, in the event that the number of times a message has been re-communicated to a particular privacy event subscriber exceeds a re-communication threshold (i.e., a maximum allowable number of retries is reached), look up the corresponding contact details (for example, email and/or mobile telephone number) for an entity (such as a team or administrator) responsible for that particular privacy event subscriber from the Subscriber Configuration Table III and send a failure alert message(s) to them (via interface #6a in FIG. 2). Additionally, or alternatively, the privacy compliance monitor 214 may also update the progress status to FAILED in Table VI. It will be seen that interface #6a in FIG. 2 comprises a Simple Notification Service email module 218, although it will be appreciated that this is merely one non-limiting technique by which the privacy compliance monitor 214 may send the messages and that any other suitable techniques may alternatively be used.

By monitoring the progress towards the privacy request being enacted in this way, the prospects of the privacy request being properly enacted may be improved by virtue of the re-communication of messages relating to the privacy events. Furthermore, where there is some sort of failure that might cause the privacy request not to be enacted until a change or repair is made to the one or more privacy event subscribers 230, this may also be identified by virtue of the re-communication threshold. By then communicating a failure alert, the prospects of resolving the problems may also be improved. Thus, error identification and diagnostics in the enactment of privacy controls may be improved.

F. User Notification Module 215

The user notification module 215 may monitor the request status column in Table IV. For each privacy event that has status COMPLETED (which corresponds to all of the one or more target privacy event subscribers 230 having enacted, or COMPLETED, the privacy request, as explained earlier), the user notification module 215 may communicate a confirmation of enactment to the end user to confirm that their privacy request has been enacted. To this end, the user notification module 215 may find the corresponding publisher ID to the privacy event and then look up its preferred asynchronous notification type in Table II (via interface #7 of FIG. 2). Further details of the notification types are given in Table VIII.

If the preferred asynchronous notification type is Email and/or SMS, the corresponding contact attributes may be fetched from the profile database 217 using the Unique User ID that is associated with the relevant Event ID in Table IV (via interface #8 of FIG. 2). This contact information in turn may help the user notification module 215 to deliver the confirmation of enactment messages to appropriate end users. If the asynchronous notification type is 'In-client', then the corresponding endpoints may be fetched directly from the Table II.

II.2 Second Example Privacy Broker System 410

Figure 4:
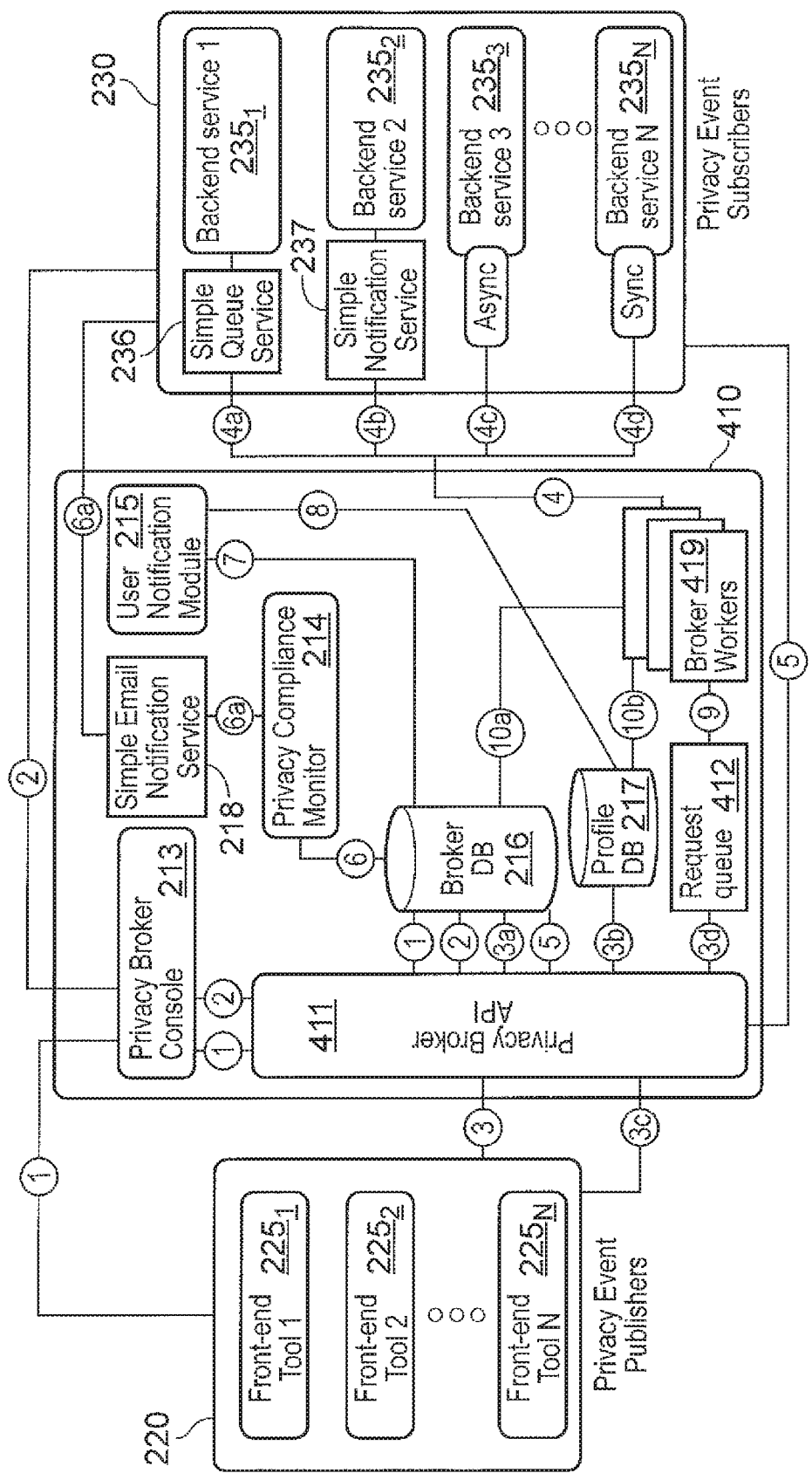
FIG. 4 shows a schematic representation of a privacy broker system in accordance with a second aspect of the present disclosure.

FIG. 4 shows a representation of a second example privacy broker system 410 in accordance with an aspect of the present disclosure. It should be noted that like reference numerals in FIGS. 2 and 4 represent the same features and entities.

In particular, the privacy event publishers 220 and the privacy event subscribers 230 represented in FIG. 4 are the same as those described above with reference to FIG. 2.

As with the privacy broker system 210 described above, the privacy broker system 410 represented in FIG. 4 is configured to route privacy messages to the appropriate privacy event subscribers 230. Furthermore, it may also be configured to track the status of the privacy event subscribers 230 with respect to honouring the users' privacy choices. However, the particular implementation of the privacy broker system 410 represented in FIG. 4 is different to the particular implementation of the privacy broker system 210 described above.

The high-level privacy broker system 410 represented in FIG. 4 comprises a Notification Module 215, a Broker Database 216, a Profile Database 217 and a Simple Notification Service Module 218, the functionality of which is described in detail above with reference to FIG. 2 and shall not be described again here. However, rather than having the Privacy Broker API 211 and the privacy broker engine 212 of the first example privacy broker system 210, the privacy broker system 410 represented in FIG. 4 instead has a privacy broker API 411, a request queue 412 and broker workers 419, the principle operations of which are described below. It will be appreciated from the description below that in the second example privacy broker system 410, the broker workers 419 may function to determine the target subscriber entities for a privacy event and communicate messages to the target subscriber entities, rather than the broker engine 212 of the first example privacy broker system 210.

The main design goal for the privacy broker API 411 is to provide endpoints for the privacy event publishers 220, the privacy event subscribers 230 and the privacy broker console 213.

The privacy broker API 411 may be mostly used by the privacy event publishers 220 (such as the front-end tools 225$_n$ that display privacy settings to the end users) to publish the privacy events and by the privacy event subscribers 230 to send messages to the privacy broker system 410.

The communications of the privacy event publishers 220 and the privacy event subscribers 230 to the privacy broker API 411 endpoints may be guarded with the help of Software Development Kits (SDKs). SDKs may ensure the communication from the broker clients (the privacy event publishers 220 and privacy event subscribers 230) is happening in a consistent (all clients using same protocols and messaging format), secure (all clients are authenticated and authorized) and reliable way (number of retries in case of not able to reach the broker).

Privacy event subscriber SDKs may also be responsible for sending a synchronous status notification that indicates the current status of progress towards honouring the end users' privacy choices.

Both the SDKs may use the gRPC protocol to communicate with the privacy event publishers 220 (although any other suitable protocol may alternatively be used) and the privacy event subscribers 230 may use protocol buffer as the messaging format (although any other suitable messaging format may alternatively be used).

First, the configuration parameters for privacy event publishers 220 and privacy event subscribers 230 (described earlier with respect to the privacy broker system 210) may be stored in the broker database 216 via the privacy broker API 411. These configuration parameters are described in Table I. Example configurations of the privacy event publishers 220 and the privacy event subscribers 230 stored in the broker database 216 are shown in Table II and Table III respectively.

The privacy broker API 411 is also responsible for entering into the request queue 412 worker requests relating to privacy events so that the broker workers 419 can carry out those worker requests. Furthermore, the privacy broker API 411 may also persist in the broker DB 216 and/or the profile DB 217 data relating to the privacy events to enable the broker works 419 to carry out worker requests in the request queue 412.

For example, when a privacy event is received from a privacy event publisher 220 (interface #3), the privacy broker API 411 may enter data relating to the privacy event into the broker DB 216 (interface #3a) and optionally also the profile DB 217 (interface #3b). The data relating to the privacy event stored in the broker DB 216 may include the data represented in Table IV and described earlier (for example, an 'Event ID', 'Publisher ID', 'unique user ID', 'request topic type' and 'request status'). The privacy broker API 411 may also enter a worker request into the request queue 412 (interface #3d), to be picked up by the broker workers 419.

The request queue 412 may be a straightforward queue, from which broker workers 419 may pick-up worker requests in a first-in, first-out fashion. Alternatively, any other form of queuing system may also be used, for example prioritising particular types of worker request so that they are picked up by broker workers 419 more quickly than other types of request. In a further alternative, the privacy broker API 411 may alternatively be configured to communicate worker requests to the broker workers 419 in any other suitable way.

The broker workers 419 may comprise one broker worker or a plurality (two or more) of broker workers operating in parallel. Each broker worker may be implemented as a relatively simple module, configured to pick-up worker requests from the request queue 412 and enact them by looking up data in the broker DB 216 and the profile DB 217 and communicating messages relating to the privacy event to the target subscriber entities as necessary. For example, when the privacy broker API 411 enters a worker request into the request queue 412, that worker request may comprise at least an event ID. When a broker worker 419 picks up the worker request (interface #9), they may look up the privacy event in Table IV of the broker DB 216 (interface #10a) and determine from the request status what action to take. At first, the request status may be "INIT", in which case the broker worker 419 may determine the target subscriber(s) for the privacy event, for example by looking up the relevant privacy event subscribers 230 in Table III of the broker DB 216.

The broker worker 419 may also update the progress status in the broker DB 216 to either SENT or SEND-FAILED in Table VI and update the event status to either IN PROGRESS or SOMEFAILED in Table IV.

When each of the target subscriber(s) send signals, for example acknowledgement signals and/or ready signals and/or completion signals, back to the privacy broker system 410 (interface #5 in FIG. 4), the privacy broker API 411 may update the progress status in Table VI respectively for those target subscribers and also enter a new worker request into the request queue 412. Again, the worker request may comprise at least the event ID and when a broker worker 419 picks up the worker request, it may check the "Progress Status" in Table VI of the broker DB 216 for that event. As explained later in 'III. Data deletion process' and 'IV. Data takeout process', depending on the current state of the "Progress Status" in Table VI of the broker DB 216, the broker workers 419 may take further action.

The privacy compliance monitor 214 and user notification module 215 may track these statuses as described earlier with reference to the first privacy broker system 210.

A benefit of implementing broker workers 419 rather than the privacy broker engine 212 may be that a plurality of relatively simple broker workers 419 can be implemented to operate in parallel, thereby improving the speed of processing of privacy events. Furthermore, if there is a failure in one of the broker workers, or if one of the broker workers takes a long time to deal with a worker request from the request queue 412, the other broker workers can continue to deal with worker requests from the request queue 412, thereby minimising the overall impact of the failing/slow broker worker. This may be particularly useful for scaling the privacy broker system 410, since in may enable the system to handle a high volume of incoming privacy events by minimising the effect of failures in the privacy broker system 410.

It will be appreciated that whilst two particular implementations of privacy broker systems have been described above, those particular implementations are not limiting and the privacy broker system of the present disclosure may be implemented in any suitable way to carry out the processes described herein.

Example processes of operation for the first privacy broker system 210 and the second privacy broker system 410 for privacy events relating to data deletion and privacy events relating to data take out shall now be described.

III. Data Deletion Process

One example privacy request is a data deletion request. Different types of data deletion request may be supported, including account level deletion request (ACCOUNT_DELETION), service level deletion request (SERVICE_DELETION) and event level deletion request (EVENT_DELETION).

An account level deletion request is a request to delete all end user data associated with an end user's account within a user realm. Therefore, this may be seen as the most wide reaching form of data deletion.

A service level deletion request is a request to delete all end user data within a particular service in a user realm (for example, all of an end user's data relating to a payment service, or all of an end user's data relating to direct marketing, profiling and personalisation, etc).

An event level deletion request is a request to delete all end user data relating to a particular event(s) of the end user (for example, deletion of records of the websites that an end user has viewed/clicked on, etc). Therefore, this may be seen as the narrowest form of data deletion.

Figure 3:
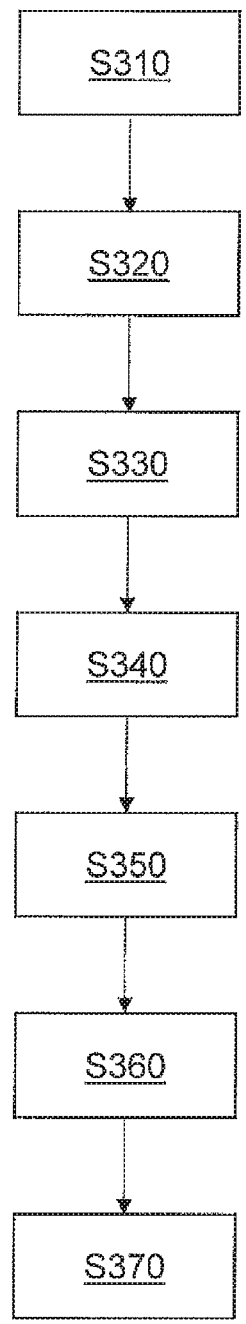
FIG. 3 shows an example representation of a method for managing an end user data deletion in accordance with an aspect of the present disclosure.

FIG. 3 shows example process steps for the first privacy broker system 210 and the second privacy broker system 410 to manage an end user data deletion request.

In step S310, for the first privacy broker system 210, the privacy broker engine 212 receives a privacy event via the privacy broker API 211, for example from one of the privacy event publishers 220 via interface #3 represented in FIG. 2 (as described in section II.1.D.2 above). The received privacy event may comprise at least: a user ID that uniquely identifies the end user to which the privacy event relates; and a data deletion request that is indicative of the type of data deletion that the end user would like to take place (for example, ACCOUNT DELETION, SERVICE_DELETION, EVENT_DELETION).

The User ID may comprise a user-realm identifier that uniquely identifies a particular user realm in which the end user would like the data deletion to take place and a user identification that is uniquely indicative of the end user within the particular user realm. The user identification may take any suitable form, for example a set of numbers and/or letters that is unique to the end user within the user realm. Where the type of the data deletion is a service level data deletion, the privacy event may further comprise a service list indicative of the one or more services within the particular user realm that the data deletion request is targeting. Where the type of the data deletion is an event level data deletion, the privacy event may further comprise an event list indicative of the one or more events within the user realm that the data deletion request is targeting.

A user realm is an identity provider, such as Facebook® or Google®, as would be well understood by the skilled person. For example, if a web app were to support both Facebook and Google login solutions, the webapp would support two user realms—Facebook and Google—within each of which an end user will have a unique user identification.

As explained in Section II.1.D.2 above, as part of this step, the privacy broker engine 212 may optionally also store the privacy event in the broker database 216 and/or notify the privacy event publisher 220 that their privacy event will eventually be honoured.

For the second privacy broker system 410, the privacy broker API 411 receives the privacy event, for example from one of the privacy event publishers 220 via interface #3 represented in FIG. 4 and enters data relating to the privacy event into the broker DB 216 (interface #3a) (as described above in section II.2). The privacy broker API 411 then submits a worker request to the request queue 412, which may comprise at least the event ID.

In Step S320, for the first privacy broker system 210, the privacy broker engine 212 may determine, based on at least part of the received privacy event, one or more target subscriber entities (each comprising a backend service $235_n$), as described in general terms in section II.1.D.3 above.

For the second privacy broker system 410, after the broker worker 419 has picked up the worker request from the request queue 412, the broker worker 419 may look up the privacy event details in the broker DB 216 (interface #10a). The broker worker 419 may determine from the progress status of the privacy event (for example, a status of INNIT) that one or more target subscriber entities should be determined. The broker worker 419 may then determine the one or more broker workers based on the privacy event.

More specifically for data deletion requests, the privacy broker engine 212 or broker worker 419 may determine one or more target subscriber entities based at least in part on the user-realm identifier in the user ID. Different subscriber entities (backend services $235_n$) will subscribe to deletion requests that identify user realms for which they may hold some data. This may be seen, for example, in Table III. In this way, regardless of the type of deletion that the end user would like to make (for example, account level, service level or event level), backend services $235_n$ that may need to take action to enact the deletion request should be notified of the deletion request. Consequently, complete and reliable data deletion may be achieved.

Where the deletion request is for a service level deletion, the target subscriber entities may be determined based on the user-realm identifier in the user ID and also the service list in the privacy event. For example, the target subscriber entities may be made up of any privacy event subscribers 230 that have subscribed to data deletion requests for the user realm identified by the user-realm identifier and also any privacy event subscribers 230 that have subscribed to data deletion requests targeting one or more of the services identified in the service list. Consequently, even backend services $235_n$ that are not subscribed to the user-realm identified by the user-realm identifier, but who may hold end user data relating to one or more of the targeted services (and have therefore subscribed to those one or more services) should be notified of the data deletion request. Consequently, complete and reliable data deletion at a service level may be achieved.

Whilst these represent some particular examples of how the privacy broker engine 212 or broker workers 419 may determine the target subscriber entities, they may alternatively determine, or be aware of, the one or more target subscriber entities in any other suitable way.

One or more of the target subscriber entities may be a two-step deletion subscriber entity. A two-step deletion subscriber entity is one that has subscribed to receive a warning of a data deletion request before they are actually instructed to enact the data deletion request. This means that they should have time to gather and archive any data that they are obliged to keep according to law (as explained earlier). It may be recorded in the broker DB 216 which privacy event subscribers 230 are two-step deletion subscriber entities.

Whilst the above describes some particular examples of how the privacy broker engine 212 or broker workers 419 may determine the target subscriber entities, they may alternatively determine, or be aware of, the one or more target subscriber entities in any other suitable way.

In Step S330, if one or more of the target subscriber entities is a two-step deletion subscriber entity, the privacy broker engine 212 or broker workers 419 communicate a prepare for deletion message to the one or more two-step deletion subscriber entities, for example via interfaces #4, #4a, #4b, #4c and #4d represented in FIGS. 2 and 4 (as explained above in Section II.1.D.4 above). Optionally, the privacy broker engine 212 or broker workers 419 may also update the statuses for each privacy event in Table VI and in Table IV, for example to indicate that a prepare for deletion message has been sent. If none of the target subscriber entities are two-step deletion subscriber entities, the privacy broker engine 212 or broker workers 419 may proceed directly to Step S370, which is described in more detail below.

The prepare for deletion message may comprise data for enabling the one or more two-step deletion subscriber entities to obtain the privacy event, so that they can identify the end user to which the privacy request relates and the type of data deletion that the end user would like to take place. They may also thereby obtain the service list or event list, if the data deletion request relates to a service level or event level deletion. For example, the prepare for deletion message may comprise the privacy event itself. Alternatively, it may comprise an identifier of the privacy event, using which the two-step subscriber entity may retrieve the privacy event (for example, from a data store in which the privacy event is stored, such as the broker DB 216).

Having received the prepare for deletion message, the two-step subscriber entity (or entities) may prepare to enact the data deletion request. This may involve gathering at least some of the data that is to be deleted and then storing or archiving that data (for example, based on the user ID, the type of deletion that is requested and, where appropriate, the service list or event list). If the deletion is a service level deletion or event level deletion, the backend service should take care to delete end user data relating only to the targeted service(s) or event(s) and leave all other end user data in the user realm unaffected. The data that is gathered may be gathered from data stores that are controlled by the two-step subscriber entity itself and/or from other related backend service entities (for example, services on which they have some sort of dependency or relationship). This may be carried out according to some sort of data retention setting of the two-step subscriber entity, which defines the type of data that it should gather and archive according to law. For example, if the two-step subscriber entity comprises a payment platform, it may be required to maintain a record of its users' transactions even when a user manifests their right to be forgotten. In this case, the payment platform would need to collect details about the end user (for example, billing address) that might be stored by other backend services, like an identity service that maintains a collection of details about the user. Consequently, the payment platform should be able to gather and archive the data before the identity service deletes the user data. This is made possible by virtue of the prepare for deletion message.

When a two-step subscriber entity has completed their preparations for deletion, they should communicate a ready for deletion message to the privacy broker system 210 or 410. In Step S340, the privacy broker system 210 or 410 receives a ready for deletion message and the broker DB 216 is updated to indicate that that two-step subscriber entity has signalled its readiness to carry out the deletion (for example, via interface #5 in FIGS. 2 and 4). In this way, the broker DB 216 may be used to keep track of which of the two-step subscriber entities have responded with a ready for deletion messages and which have not yet responded.

Whenever a ready for deletion message is communicated to the privacy broker system 210 or 410 from a target two-step subscriber entity, it is determined whether or not all of the target two-step subscriber entities have signalled their readiness for deletion. In the first privacy broker system 210, the privacy broker engine 212 may perform this determination by checking the progress statuses in the broker DB 216. In the second privacy broker system 410, when a ready for deletion message is received at the privacy broker API 411, a worker request comprising at least the event ID may be entered into the request queue 412 and then picked up by a broker worker 419. The broker worker 419 may then check the progress statuses in the broker DB 216.

In Step S350, the broker engine 212 or broker worker 419 determine (for example, with reference to the broker DB 216) whether or not all of the target two-step subscriber entities have signalled their readiness for deletion. If at least one of the target two-step subscriber entities have not signalled their readiness, no further action is taken. If it is determined that all of the target two-step subscriber entities have signalled their readiness, the process proceeds to Step S360.

All the time, the privacy compliance monitor 214 may also monitor the statuses in the broker DB 216. By monitoring the statuses in the broker DB 216, the privacy compliance monitor 214 may identify any two-step deletion subscriber entities that have failed to respond to the prepare for deletion message with a ready for deletion message within a threshold period of time (for example, within 1 day, or within 6 hours, etc. See Tables III and VI for example threshold periods of time—'time to act'). On identifying such a two-step deletion subscriber entity, it may determine whether or not the number of times the prepare for deletion message has been recommunicated to the identified two-step deletion subscriber entity exceeds a prepare for deletion message recommunication threshold. If that threshold has not be exceeded, the prepare for deletion message be recommunicated to the identified two-step deletion subscriber entity. If the prepare for deletion message recommunication threshold has been reached, the compliance monitor 214 may perform a predetermined privacy event failure action (for example, updating the process status to FAILED in Table VI and/or sending a failure alert message to an entity responsible to the particular two-step deletion subscriber entity). This operation of the privacy compliance monitor 214 is also described more completely above in Section II.1.E above.

In Step S360, the privacy broker engine 212 or broker worker 419 communicates a deletion message to the one or more target subscriber entities to instruct them to enact the data deletion request of the end user. Some of the target subscriber entities may be two-step deletion subscriber entities and others may be subscriber entities who did not subscribe to the two-step deletion process (for example, because they do not have dependencies on other backend services). By instructing the target subscriber entities in this way, only after all of the two-step deletion subscriber entities have signalled their readiness is deletion enacted, which means that deletion of data may be carried out with confidence that all target subscriber entities have prepared themselves for the deletion as necessary. Furthermore, the privacy broker system 210 or 410 does not need a dependency graph between the backend services, which would be very difficult to obtain and maintain. Instead, each backend service can keep track of their own dependencies and is given the time to gather and archive the data required to both fulfil the user data deletion request and also their legal obligations. Therefore, data deletion may be reliably carried out in a more straightforward, technically efficient manner.

The deletion message comprises data suitable for enabling the one or more target subscriber entities to obtain the privacy event. For example, the deletion message may comprise the privacy event itself. Alternatively, it may comprise an identifier of the privacy event, using which the target subscriber entity may retrieve the privacy event (for example, from a data store in which the privacy event is stored, such as the broker DB 216). Alternatively, where the deletion message is being sent to a two-step deletion subscriber entity, the deletion message may comprise an identifier of the privacy event so that the two-step deletion subscriber entity can refer to the privacy event that they obtained earlier from the prepare for deletion message.

When a target subscriber entity has enacted their deletion, they may communicate to the privacy broker system 210 or 410 a completion notification indicative of having successfully enacted the data deletion request. In Step S370, the privacy broker system 210 or 410 receives a completion notification from a target subscriber entity and the broker DB 216 is updated to indicate that that target subscriber entity has signalled completion of its data deletion (for example, via interface #5 in FIG. 2 or 4). In this way, the broker DB 216 may be used to keep track of which of the target subscriber entities have successfully enacted their data deletion.

The privacy compliance monitor 214 may monitor the broker DB 216 to identify (for example, using the progress status identifier in the broker DB 216) any target subscriber entities that have failed to respond to the deletion message with a completion notification indicative of having successfully enacted the data deletion request within a threshold period of time (for example, within 1 day, or within 6 hours, etc. See Tables III and VI for example threshold periods of time—'time to act'). On identifying a target subscriber entity that has not signalled success within the threshold period of time, the privacy compliance monitor 214 may determine whether or not the number of times the deletion message has been recommunicated to the identified target subscriber entity exceeds a deletion message recommunication threshold. If that threshold has not been exceeded, the deletion message may be recommunicated to the identified target subscriber entity. If the deletion message recommunication threshold has been reached, the compliance monitor may perform a predetermined privacy event failure action (as explained earlier). This operation of the privacy compliance monitor 214 is also described more completely above in Section II.1.E.

Optionally, if it is determined that all of the target subscriber entities have responded with a completion notification, the user notification module 215 may communicate a confirmation of enactment to the end user to confirm that their data deletion request has been enacted. This is described in more detail in Section II.1.F above.

Whilst two particular implementations of the privacy broker system have been described for performing the above data deletion process, it will be appreciated that the privacy broker system of the present disclosure may be implemented in any suitable way for performing the above described process. In particular, it may be implemented in any way suitable for communicating a prepare for deletion message to one or more two-step deletion subscriber entities and then communicating a deletion message to the one or more target subscriber entities only after a ready for deletion message is received from each of the one or more two-step deletion subscriber entities.

IV. Data Takeout Request Process

A further example privacy request is a data takeout request (also sometimes referred to as a data download request). Data takeout requests relate to an end user's right to access/download their own data in a human readable format. Various different types of data relating to an end user may include at least one of the following:

a) Actual data—data knowingly and willingly given by the end user (eg, name, age, etc)
b) Observed data—counting of number of views/likes, etc
c) Inferred data—probability outputs from machine learning algorithms
d) Derived data—derived additional information (eg, IP to Geo coordinates, analysing of image metadata and creating location information)
e) Purchased data—data about the end user, purchased from a third party (eg, car purchase data)

When a data takeout request is submitted by an end user, any backend services $235_N$ holding any of the above types of data should provide the data to the privacy broker system 210 or 410 as part of honouring the data takeout request.

Figure 5:
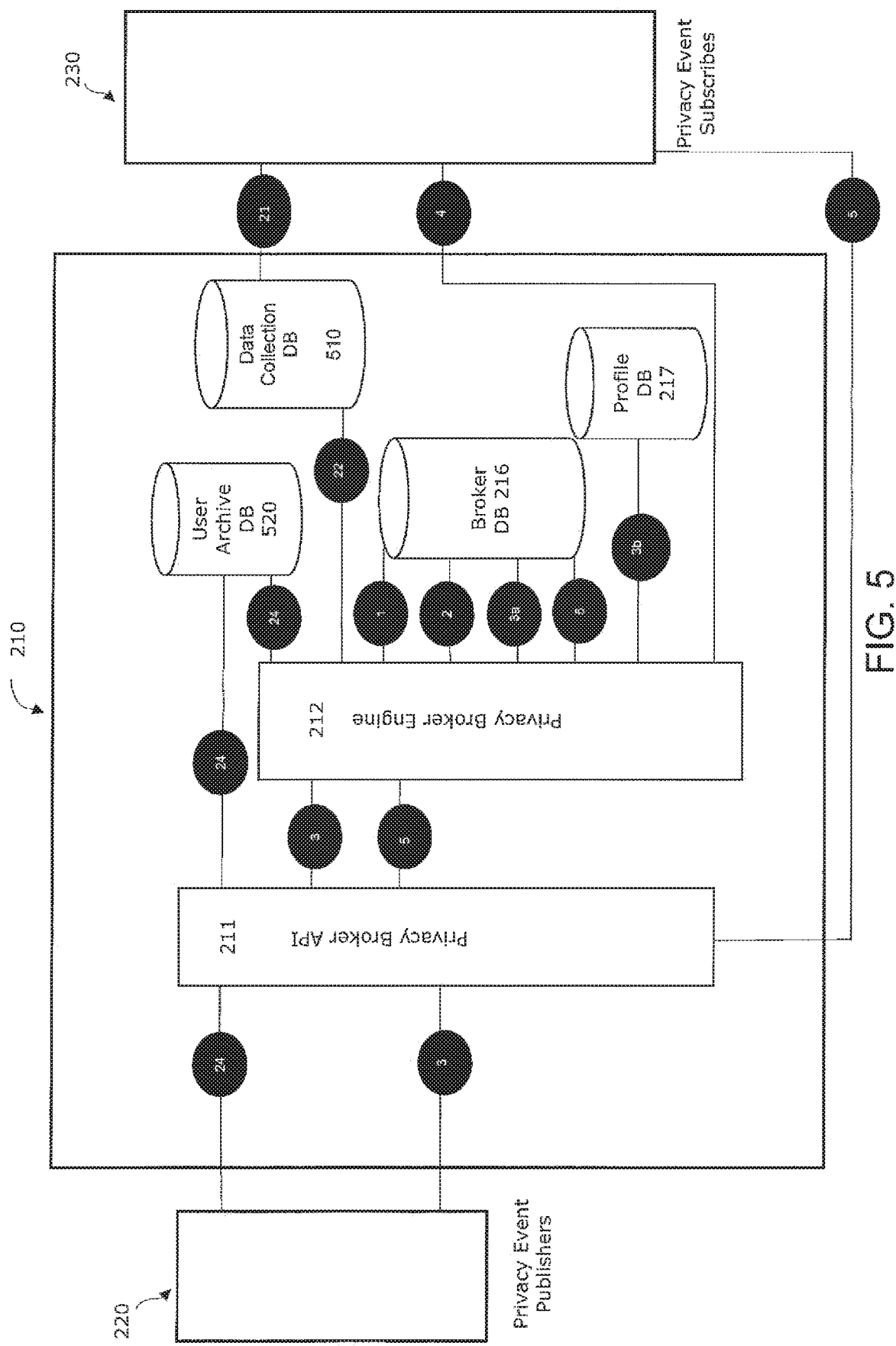
FIG. 5 shows some further example implementation details of the privacy broker system of FIG. 2.

FIG. 5 shows some further implementation details of the first privacy broker system 210 in relation to honouring data takeout requests.

Figure 6:
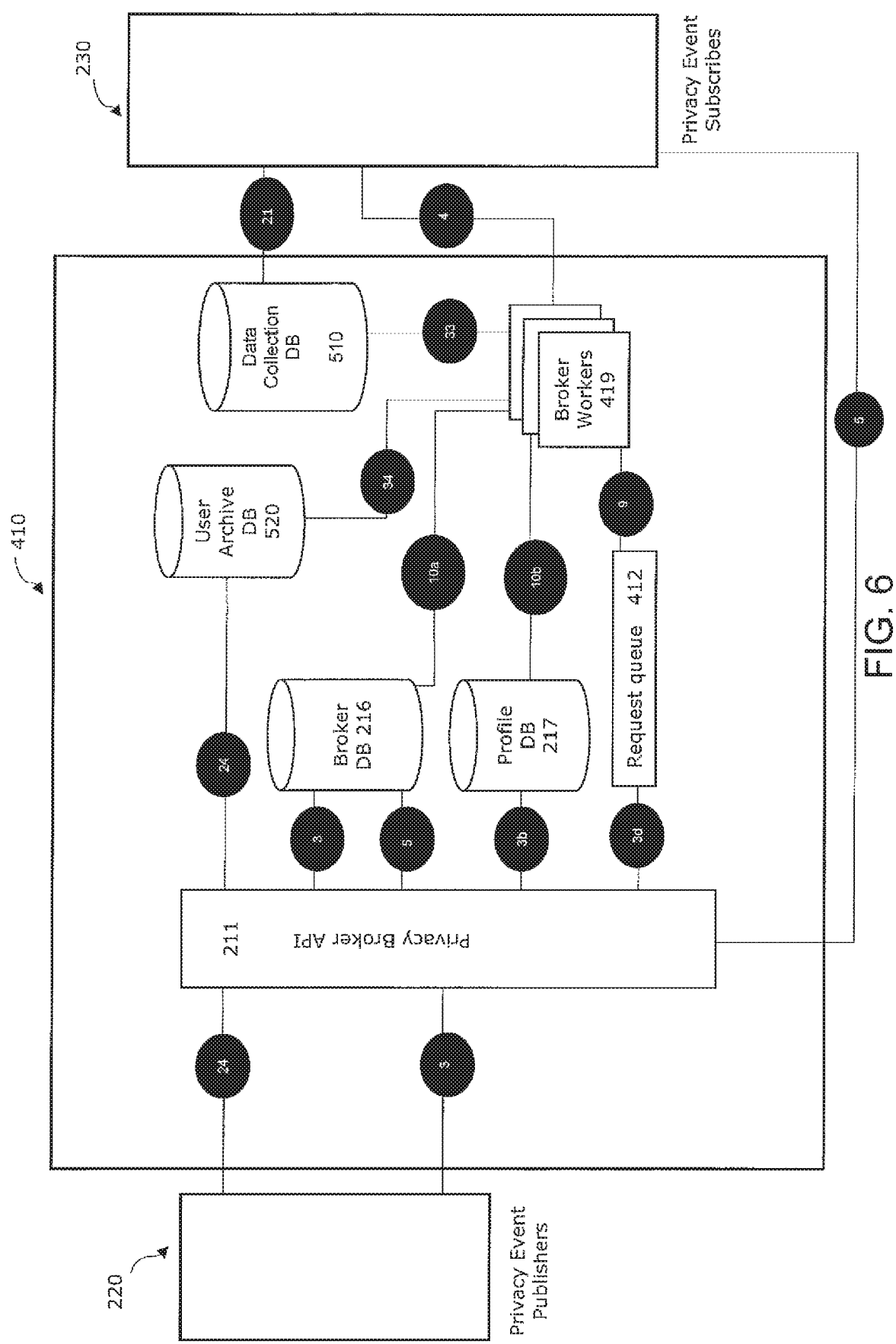
FIG. 6 shows some further example implementation details of the privacy broker system of FIG. 4.

FIG. 6 shows some further implementation details of the second privacy broker system 410 in relation to honouring data takeout requests.

In both FIGS. 5 and 6, the privacy broker systems 210 and 410 further comprise a data collection database (or data collection bucket) 510 and a user archive database (or user archive bucket) 520. Whilst FIGS. 5 and 6 represent the data collection database 510 and user archive database 520 as being standalone modules (for example, S3 Buckets), they may alternatively be implemented as parts of the broker DB 216, or any other suitable database.

FIGS. 5 and 6 both show example functionality of the privacy broker systems 210 and 410 for explaining how the privacy broker systems 210 and 410 may handle data takeout requests. Other features, such as the privacy broker console 213, privacy compliance module 214 and user notification module 215 are not represented in FIG. 5 or 6 for the sake of simplicity, but it will be appreciated that those features may still be present in the privacy broker systems 210 and 410 and function in the ways described above.

Figure 7:
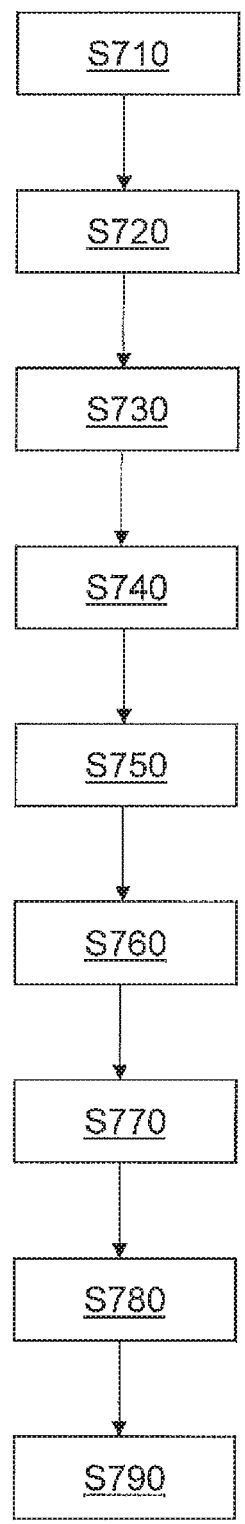
FIG. 7 shows an example representation of a method for managing an end user data takeout in accordance with an aspect of the present disclosure.

FIG. 7 shows an example representation of a method for managing an end user data takeout in accordance with an aspect of the present disclosure.

In step S710, for the first privacy broker system 210, the privacy broker engine 212 receives a privacy event via the privacy broker API 211, for example from one of the privacy event publishers 220 via interface #3 represented in FIG. 5 (as described in section II.1.D.2 above). The received privacy event may comprise at least: a user ID that uniquely identifies the end user to which the privacy event relates; and a data takeout request.

The User ID may take any suitable form to uniquely identify the end user, for example a user-realm identifier that uniquely identifies a particular user realm in which the end user would like the data deletion to take place and a user identification that is uniquely indicative of the end user within the particular user realm (as explained earlier in respect of a deletion request), or simply as an identifier that is unique to the end user across all realms.

As explained in Section II.1.D.2 above, as part of this step, the privacy broker engine 212 may optionally also store the privacy event in the broker database 216 and/or notify the privacy event publisher 220 that their privacy event will eventually be honoured.

For the second privacy broker system 410, the privacy broker API 411 receives the privacy event, for example from one of the privacy event publishers 220 via interface #3 represented in FIG. 6 and enters data relating to the privacy event into the broker DB 216 (interface #3*a*) (as described above in section II.2). The privacy broker API 411 then submits a worker request to the request queue 412 comprising at least the event ID.

In Step S720, for the first privacy broker system 210, the privacy broker engine 212 determines, based on at least part of the received privacy event, one or more target subscriber entities (each comprising a backend service 235*ₙ*), as described in general terms in section II.1.D.3 above.

For the second privacy broker system 410, after the broker worker 419 has picked up the worker request from the request queue 412, the broker worker 419 may look up the privacy event details in the broker DB 216 (interface #10*a*). The broker worker 419 may determine from the progress status of the privacy event (for example, a status of INNIT) that one or more target subscriber entities should be determined. The broker worker 419 may then determine the one or more broker workers based on the privacy event.

More specifically, the privacy broker engine 212 or broker worker 419 may determine the one or more target subscribers based at least in part on the privacy request (i.e., a data takeout request). For example, the one or more target subscriber entities may be those that are indicated in Table III of the Broker DB 216 as being subscribed to data takeout privacy requests. Optionally, the one or more target subscriber entities may be further determined based on the User ID and/or the service list, as described in more detail in 'III. Data Deletion Request Process' above.

Whilst these represent some particular examples of how the privacy broker engine 212 or broker workers 419 may determine the target subscriber entities, they may alternatively determine, or be aware of, the one or more target subscriber entities in any other suitable way.

In Step S730, the privacy broker engine 212 or broker workers 419 communicate a data takeout message to the one or more target subscriber entities, for example via interface #4 represented in FIGS. 5 and 6 (as explained above in Section II.1.D.4). Optionally, the privacy broker engine 212 or broker workers 419 may also update the statuses for each privacy event in Table VI and in Table IV, for example to indicate that a data takeout message has been sent.

The data takeout message instructs the one or more target subscriber entities to enact the data takeout request and may comprise data for enabling the one or more target subscriber entities to obtain the privacy event, so that they can identify the end user to which the privacy request relates and that the end user would like to carry out a data takeout. They may also thereby obtain the service list or event list, if the data takeout request relates to a service level or event level data takeout. For example, the data takeout message may comprise the privacy event itself. Alternatively, it may comprise an identifier of the privacy event, using which the target subscriber entities may retrieve the privacy event (for example, from a data store in which the privacy event is stored, such as the broker DB 216).

Having received the data takeout message, the one or more target subscriber entities should start to collect the relevant user data to fulfil the data takeout request. When a target subscriber entity is ready to provide the collected user data, it may communicate to the privacy broker system 210 or 410 (via interface #5) a request for a data collection DB address to which it can upload the collected user data.

In Step S740, the privacy broker system 210 or 410 receives from a target subscriber entity a request for a data collection DB address. In the first privacy broker system 210, the privacy broker engine 212 receives this request via the privacy broker API 211 and interfaces with the data collection DB 510 (via interface #22 in FIG. 5) to establish an address for use by the target subscriber entity. In the second privacy broker system 410, the privacy broker API 411 enters the target subscriber entity's request into the request queue 412 as a worker request. When a broker worker 419 picks up the worker request, it will interface with the data collection DB 510 to establish an address for use by the target subscriber entity.

In Step S750, the privacy broker engine 212 or broker worker 419 communicates the established address to the relevant target subscriber entity, via interface #4.

It will be appreciated that this is merely one example process of communicating an upload address for the data collection DB 510 to the one or more target subscriber entities 230. In an alternative, upload addresses for the data collection DB 510 may be included in the data takeout message communicated to the one or more target subscriber entities in Step S730, in which case Steps S740 and S750 may be omitted from the process represented in FIG. 7 may proceed from Step S730 to Step S760.

The data collection DB 510 is a place where user data from different backend services may be collected. Each target subscriber entity may be allocated one or more addresses of the data collection DB 510 to which they can upload user data. For example, the internal structure of the data collection DB 510 may take a form such as:
/<request-id-0>/<back-end-0>/<archive-0>
/<request-id-0>/<back-end-0>/<archive-1>
/<request-id-0>/<back-end-1>/<archive-0>
/<request-id-1>/<back-end-0>/<archive-0>

In this example, data takeout request id 0 has two target subscriber entities—back-end-0 and back-end-1. Backend-0 has two areas to which it may upload data—archive-0 and archive-1—for example because it holds two different types of end user data that should be uploaded separately. Back-end-1 has a single area to which it may upload data—archive-0. Data takeout request id 1 has one target subscriber entity—back-end-0—which has a single area to which it may upload data—archive-0. Thus, at least one different upload address can be provided to each of the target subscriber entities for each data takeout request.

The data collection DB 510 may be configured to allow upload only access to the one or more target subscriber entities. This may be achieved by providing the upload addresses for the data collection DB 510 as one or more signed URLs that only allow the HTTP PUT method. Each of the one or more target subscriber entities may then use the signed URL to upload their collected user data to their allocated area of the data collection DB 510 using the HTTP PUT method. In this way, it may be ensured that no backend services can read data (which may be very sensitive) from the data collection DB 510, so as to protect the data in the data collection DB 510 from any rogue entities. Furthermore, by allocating different regions of the data collection DB 510 to each target subscriber entity and providing a signed URL in respect of those allocated regions, it may be ensured that no backend service may overwrite data coming in from other backend services. Whilst signed URLs and the HTTP PUT method is one particular example of how upload only access to the data collection DB 510 may be achieved, the skilled person will appreciate that upload only access may be implemented in any other suitable way.

In Step S760, at least some of the one or more target subscriber entities upload to the data collection DB 510 their collected user data relating to the end user. Optionally, the privacy broker system 210 or 410 may also receive (via interface #5) a completion notification from each target subscriber entity to confirm that they have either uploaded their user data to the data collection DB 510, or that they do not have any user data relating to the end user.

In Step S770, the broker engine 212 or broker workers 419 may determine whether or not all of the one or more target subscriber entities have uploaded their user data. This may be carried out in a number of different ways. For example, the broker engine 212 or broker workers 419 may monitor the data collection DB 510 (via interface #22 in FIG. 5 and interface #33 in FIG. 6). Alternatively, if completion notifications are issued by the one or more target subscriber entities, then these may be used.

For example, in the first privacy broker system 210, when a completion notification is received at the privacy broker engine 212 via the privacy broker API 211, the privacy broker engine 212 may update the progress status for that target subscriber entity in the broker DB 216. The privacy broker engine 212 may then check the progress statuses of all target subscriber entities in the broker DB 216 to see if all of the one or more target subscriber entities for the privacy event have communicated a completion notification. In the second privacy broker system 410, when a completion notification is received at the privacy broker API 411, the privacy broker API 411 may update the progress status in the broker DB 216 and enter a worker request into the request queue 412. The worker request comprises at least the event ID and when a broker worker 419 picks up the worker request, they may check the progress status in the broker DB 216 to determine whether or not all of the one or more target subscriber entities have communicated a completion notification.

If at least one of the target subscriber entities have not completed their data upload, no further action is taken. If it is determined that all of the target subscriber entities have completed their uploads, the process proceeds to Step S780.

All the time, the privacy compliance monitor 214 may also monitor the statuses in the broker DB 216. By monitoring the statuses in the broker DB 216, the privacy compliance monitor 214 may identify any target subscriber entities that have failed to upload their user data within a threshold period of time (for example, within 1 day, or within 6 hours, etc. See Tables III and VI for example threshold periods of time—'time to act'). On identifying such a target subscriber entity, it may determine whether or not the number of times the data takeout message has been recommunicated to the identified subscriber entity exceeds a data takeout message recommunication threshold. If that threshold has not been exceeded, the data takeout message may be recommunicated to the identified two-step deletion subscriber entity. If the prepare for deletion message recommunication threshold has been reached, the compliance monitor 214 may perform a predetermined privacy event failure action (for example, updating the status to FAILED in Table VI and/or sending a failure alert message to an entity responsible to the particular subscriber entity). This operation of the privacy compliance monitor 214 is also described more completely above in Section II.1.E above.

In Step S780, the privacy broker engine 212 or broker worker 419 aggregates the received user data in order to create a single downloadable archive for the end user. The data collection DB 510 may be configured to allow data downloads by the privacy broker engine 212 or the broker workers 419 (via interfaces #22 and #33). Depending on the format of user data in the data collection DB 510, the privacy broker engine 212 or broker workers 419 may need to extract the content of the user data to a local folder before aggregating all of the user data. The user data may then be aggregated in the user archive DB 520 (via interface #23 in FIG. 5 and interface #34 in FIG. 6), or in any other suitable location, in any format that is suitable for end user download (for example, in a .zip format). After aggregating the user data, the privacy broker engine 212 or broker workers 419 may delete the user data from the data collection DB 510, so as to minimise the amount of potentially sensitive user data that is kept within the privacy broker system 210 or 410.

In Step S790, the aggregated user data is made available for download by the end user. For example, a secure download address may be generated as a signed URL and may be communicated to the end user to enable the end user to securely download their data from the user archive DB 520 using a front-end tool via interface #24. The secure download address for the end user's aggregated user data may be created and communicated to the end user in any suitable way. For example, the privacy broker API 211 or 411 may receive a request for a download URL from a front end tool and may in turn ask the user archive DB 520 for a signed URL. The signed URL may then be returned to the front end tool by the privacy broker API 211, or may be communicated via a different mechanism, for example email. Alternatively, after aggregating the user data, the privacy broker engine 212 or broker workers 419 may obtain a signed URL from the user archive DB 520 and communicate the signed URL to the end user in any suitable way (for example, by email, etc). In any event, the end user is provided with a mechanism by which it can perform a download of all of its aggregated user data from a single point. The aggregated user data may take any suitable form that is useful for the end user, for example it may be aggregated in a single .zip file that may be downloaded by the end user in one go.

Optionally, the secure download address communicated to the end user may be valid for only a limited amount of time after the secure download address is generated. In this way, unless the end user triggers the download within the limited time, the download address would expire so that no-one can then use the download address. Thus, if the download address were compromised and an attacker tried to use it to download the user data, it is likely that the address will have expired before they could use it.

Consequently, it can be seen that the privacy broker systems 210 and 410 can be configured to handle data takeout requests in such a way that user data can be collected from various different backend services that may hold user data relating to the end user and then aggregated to allow the end user a single, secure point of download. Thus, data takeout may be made more straightforward, efficient and secure.

Optionally, the data collection DB 510 may be configured to delete end user data that has been in the data collection DB 510 for a period of time, such as one week or two weeks. This may reduce the data security risk for any user data collected in the data collection DB 510, and may be particularly useful where some target subscriber entities take a very long time to upload their user data.

Further optionally, the user archive DB 520 may be configured to delete the aggregated user data after user download and/or after a particular period of time has expired since the user data was aggregated, for example one day, or 3 days, etc. Again, this may reduce the data security risk for the user data.

In the particular implementations described above, the data collection DB 510 and the user archive DB 520 are configured as separate data stores. However, in alternative implementations, the data collection DB 510 and the user archive DB 520 may be implemented as separate areas within a single database or data store (such as separate areas within the broker DB 216 or any other database), or they may be implemented as the same, single database (for example, a data collection and user archive DB). Regardless of particular implementation, it may still be preferable to manage the data collection DB 510 and the user archive DB 520 separately, so that upload and download access may be controlled separately in order to improve the security of user data. In particular, by collecting user data from the different subscriber entities in the data collection DB 510 and then aggregating it in the archive DB 520, it is possible to restrict access to entities external to the privacy broker systems 210 and 410 to particular types of data only—upload only access to the data collection DB 510 for the subscriber entities and download only access to the user archive DB 520 for the end user. Consequently, other, potentially fraudulent entities cannot gain any type of access to user data and even rogue subscriber entities cannot gain access to user data that originates from any other subscriber entities.

Whilst the data deletion and data takeout processes are described separately above, it will be appreciated that the privacy broker systems 210 and 410 may be configured to handle either or both of these types of privacy request as described above.

The skilled person will readily appreciate that various alterations or modifications may be made to the above described aspects of the disclosure without departing from the scope of the disclosure. By way of example, FIGS. 2 and 4 show representations of the privacy broker systems 210 and 410 comprising multiple separate modules or entities, such as the privacy broker engine 212, the privacy broker API 211 or 411, the broker DB 216, the profile DB 217, the broker workers 419, etc. However, any suitable distribution of functionality between different functional units or processors may be implemented, with only two particular implementations represented in FIGS. 2 and 4 for the sake of clarity. For example, each of the privacy broker systems 210 and 410 may comprise a single entity or module that is configured to perform all of the functionality of the privacy broker systems 210 and 410 described above. Alternatively, the privacy broker systems 210 and 410 may each comprise a plurality (i.e., two or more) interconnected entities or modules that are configured to together perform the functionality of the privacy broker systems 210 and 410 described above.

The different entities or modules of the privacy broker systems 210 and 410 represented in FIGS. 2 and 4 may all be co-located (potentially within the same physical entities, such as all part of an electronic device such as a server or computer) or located in different geographical places. For example, the privacy broker engine 212 may be in one geographical location (for example, part of an electronic device in one place) and the broker DB 216 and profile DB 217 may be in a different geographical location (for example, in a different country). Furthermore, whilst the broker DB 216 and profile DB 217 are described as separate entities, they may alternatively be different parts of the same entity (for example, different areas within the same database, one area for data relating to the privacy broker and the other for data relating to the end user).

The privacy broker console 213 and/or the privacy broker API 211 and/or privacy broker API 411 are optional entities or modules within the privacy broker system 210. In an alternative, the privacy broker engine 212 or broker workers 411 may interface, and communicate, with the privacy event publishers 220 and privacy event subscribers 230 in any other suitable way. Likewise, the broker DB 216 and profile DB 217 are also optional, in that the privacy broker engine 212 may communicate the privacy events to the privacy event subscribers 230 in any suitable way and not then monitor the progress towards enactment of the privacy requests.

Likewise, the privacy compliance monitor 214 and the user notification module 215 are also optional.

The various communications paths and interfaces in FIGS. 2 and 4 are all represented as direct interfaces or paths between different modules and entities. However, it will be appreciated that there may alternatively be any number of intermediate modules or entities, such as routers, proxies, etc, etc. The communications between the different modules and entities may be carried out using any suitable communications architectures, protocols and standards.

Whilst not represented in FIGS. 2 and 4, it will be appreciated that the privacy broker systems 210 and 410 may each comprise one or more processors (such as microprocessors) and/or logic (such as programmable logic, field programmable gate arrays (FPGAs), etc) and/or memory (for example volatile or non-volatile memory, such as RAM, ROM, EPROM, Flash, etc) for performing the above functionality.

The aspects of the present disclosure described in all of the above may be implemented by software, hardware or a combination of software and hardware. For example, the functionality of the privacy broker systems 210 and 410 may be implemented by software comprising computer readable code, which when executed on the processor of any electronic device, performs the functionality described above. The software may be stored on any suitable computer readable medium, for example a non-transitory computer-readable medium, such as read-only memory, random access memory, CD-ROMs, DVDs, Blue-rays, magnetic tape, hard disk drives, solid state drives and optical drives. The computer-readable medium may be distributed over network-coupled computer systems so that the computer readable instructions are stored and executed in a distributed way. In a further example, the functionality of the privacy broker system may be carried out by an electronic device configured in any suitable way (for example, by virtue of programmable logic, or fixed logic, etc) to perform such functionality (such as one or more servers, one or more desktop computers, one or more laptop computers, etc).

Tables

TABLE I

CONFIGURATION PARAMETERS FOR PUBLISHERS AND SUBSCRIBERS

| Parameters | Definition |
| --- | --- |
| Publisher ID | An identifier (for example, a number, or code, or alpha-numeric code) that uniquely identifies the front-end tool that provides privacy controls within ecosystem of services. |
| Topic Type | The type of privacy control that may be used by the end users within that publisher ID. |
| Async Notification Type | Mode of notifications to the end users about the status of their privacy requests triggered via the privacy controls. Refer to Table VIII for different types of notifications. |
| Retry Count | Number of retries that need to be performed in case the privacy broker system is not reachable from the privacy event publisher. |
| Retry Delay Gap | Time difference between two successive failure retries. |
| Subscriber ID | An identifier (for example, a number, or code, or alpha-numeric code) that uniquely identifies a service or a group of services that needs to make changes to their internal behaviours and states towards honouring the users' privacy choices. |
| Time to Honour | Total time taken for the backend services to acknowledge, make appropriate changes to their services, and send completion signal to the privacy broker system. The maximum value for time to honour for a backend service corresponding to a topic type may be set according to ecosystem requirements, or according to any other requirements. |
| Contact | Email addresses for alert messages in presence of failures such as the privacy broker engine being unable to reach the backend services or the privacy broker engine not receiving the completion signal within mentioned Time to Honour. May alternatively be an address for any other suitable communications mechanism, such as a telephone number or IP address, etc. |
| Subscription Type | Mode of communication to the backend service. In this example, four options are supported towards addressing a wide variety of services: a) Synchronous call, b) Asynchronous call, c) Amazon ® Simple Queue Service and d) Amazon ® Simple Notification Service, although additional or alternative options may be supported. |
| URI | Endpoints offered by the backend services to the privacy broker system to send the privacy events. |

TABLE II

SAMPLE PUBLISHER CONFIGURATION IN THE BROKER DATABASE

| Publisher ID | Request Topic Type | Async Notification Type | Retry Count | Retry Delay Gap |
| --- | --- | --- | --- | --- |
| 1234 | Data Deletion | {User Email, User Mobile SMS} | 3 | 2 seconds |
| 1234 | Data Takeout | {User Email, User Mobile SMS} | 3 | 3 seconds |

TABLE III

SAMPLE SUBSCRIBER CONFIGURATION IN THE BROKER DATABASE

| Subscriber ID | Request Topic Type | User realm | Service ID | Subscription Type | Time to Act | Failure Retry Count | Retry Delay Gap | Contact |
| --- | --- | --- | --- | --- | --- | --- | --- | --- |
| 12344 | Data Deletion | spid.no | finn.no | {Async API call} | 1 day | 5 | 2 secs | a@schibsted.com |
| 12346 | Data Takeout | spid.com | blocket.se | {Amazon SQS} | 1 day | 4 | 3 secs | d@schibsted.com |
| 12347 | Data Deletion | spid.com | blocket.se | {Sync API Call} | 6 hours | 4 | 5 secs | g@schibsted.com |

TABLE IV

SAMPLE PRIVACY EVENTS IN THE BROKER DATABASE

| Event ID | Publisher ID | Unique User ID | Request Topic Type | Request Status |
|---|---|---|---|---|
| 123453 | 1234 | A8910 | Event Data Deletion | INIT |
| 123442 | 1234 | A1235 | Data Takeout | SOMEFAILED |
| 123461 | 1234 | B1235 | Account Data Deletion | COMPLETED |
| 123430 | 1234 | A4567 | Service Data Deletion | INPROGRESS |

TABLE V

STATUS FIELD OPTIONS IN THE PRIVACY EVENTS TABLE IN BROKER DATABASE

| Request Status Options | Definition |
|---|---|
| INIT | Progress details are written to the broker database, privacy event not yet sent to the subscriber |
| INPROGRESS | The request is in progress by the broker engine or by the subscribers |
| COMPLETED | User's choice is honoured by all the necessary services |
| SOMEFAILED | At least one of the necessary has failed to either honour or send the completion notification |

TABLE VI

SAMPLE SUBSCRIPTION NOTIFICATION PROGRESS TABLE IN THE BROKER DATABASE

| Event ID | Subscriber ID | Time to Act | Progress Status |
|---|---|---|---|
| 123453 | 12348 | 1 day | INIT |
| 123442 | 12344, 12349 | 1 day | FAILED |
| 123461 | B1235 | 1 day | SENT |
| 123430 | 12348 | 1 day | COMPLETED |

TABLE VII

STATUS FIELD OPTIONS IN THE SUBSCRIPTION NOTIFICATION PROGRESS TABLE IN BROKER DATABASE

| Status Options | Definition |
|---|---|
| INIT | Progress details are written to the DB, privacy event not yet sent to the privacy event subscriber |
| 'PREPARE FOR DELETION MESSAGE' SENT | A prepare for deletion message has been sent to the privacy event subscriber |
| 'DELETE MESSAGE' SENT | A prepare for deletion message has been sent to the privacy event subscriber |
| COMPLETED | Privacy event subscriber has honoured the privacy request and completion notification is received |
| SENDFAILED | Failure in sending a message to the privacy event subscriber. Refers to the last attempt to send or resend the message |
| FAILED | Alert has been sent to the relevant team. Used maximum number of retries |

TABLE VIII

ASYNC NOTIFICATION TYPES AND DEFINITIONS

| Notification Types | Definition |
|---|---|
| Email | Email address of the end user who triggered the privacy event |
| SMS | Mobile Phone number of the end user who triggered the privacy event |
| In-client | Push to the vendor specific mobile notification services for mobile devices and display in the privacy notification section of the front-end tool |

The invention claimed is:

1. A privacy broker system for managing user data deletion across a plurality of end user services, the privacy broker system comprising:
 a memory storing computer readable code; and
 a processor operatively coupled to the memory, the processor configured to:
  receive a privacy event comprising a data deletion request relating to an end user of the plurality of end users;
  communicate a prepare for deletion message to one or more two-step deletion target subscriber entities to instruct the one or more two-step deletion target subscriber entities to prepare to enact the data deletion request, wherein the prepare for deletion message comprises data for enabling the one or more two-step deletion target subscriber entities to obtain the privacy event; and
  communicate a deletion message to the one or more two-step deletion target subscriber entities only after a ready for deletion message is received from each of the one or more two-step deletion target subscriber entities, wherein the deletion message instructs the one or more two-step deletion target subscriber entities to enact the data deletion request;
 wherein each of the one or more two-step deletion target subscriber entities comprises a backend service entity for enacting the data deletion request.

2. The privacy event system of claim 1, wherein the privacy event comprises:
 a user ID that uniquely identifies the end user; and
 the data deletion request that is indicative of a type of data deletion that the end user would like to take place.

3. The privacy broker system of claim 1, further configured to:
 determine the one or more two-step deletion target subscriber entities based at least in part on the privacy event.

4. The privacy broker system of claim 2, wherein the user ID comprises:

a user-realm identifier that uniquely identifies a particular user realm in which the end user would like the data deletion to take place; and a user identification that is uniquely indicative of the end user within the particular user realm.

5. The privacy broker system of claim 4, further configured to:

determine the one or more two-step deletion target subscriber entities based at least in part on the user realm identifier.

6. The privacy broker system of claim 5, wherein the one or more two-step deletion target subscriber entities comprises subscriber entities that have subscribed to data deletion requests that identify the particular user realm.

7. The privacy broker system of claim 5, wherein the type of data deletion that the end user would like to take place is a service level data deletion, and wherein:

the privacy event further comprises a service list indicative of one or more services within the particular user realm that the data deletion request is targeting, and wherein determination of the one or more two-step deletion target subscriber entities is further based at least in part on the service list, and wherein the one or more two-step deletion target subscriber entities comprises:

one or more two-step deletion subscriber entities that have subscribed to data deletion requests that identify the particular user realm, and/or one or more two-step deletion subscriber entities that have subscribed to data deletion requests that identify at least one of the one or more services.

8. The privacy broker system of claim 1, wherein the type of data deletion that the end user would like to take place is an event level deletion, and wherein the data deletion request further comprises an event list indicative of one or more events within the particular user realm that the data deletion request is targeting.

9. The privacy broker system of claim 1, wherein the type of data deletion that the end user would like to take place is an account level data deletion.

10. A method for managing user data deletion across a plurality of end user services, the method comprising:

receiving a privacy event comprising a data deletion request relating to an end user of a plurality of end users;

communicating a prepare for deletion message to one or more two-step deletion target subscriber entities to instruct the one or more two-step deletion subscriber entities to prepare to enact the data deletion request, wherein the prepare for deletion message comprises data for enabling the one or more two-step deletion subscriber entities to obtain the privacy event, wherein the deletion message instructs the one or more two-step deletion target subscriber entities to enact the data deletion request; and communicating a deletion message to the one or more two-step deletion target subscriber entities only after a ready for deletion message is received from each of the one or more two-step deletion subscriber entities, wherein each of the one or more two-step deletion target subscriber entities comprises a backend service entity for enacting the data deletion request.

11. A computer program stored in a memory configured to perform the method of claim 10, when executed on a processor of an electronic device.

12. A two-step deletion subscriber entity comprising a backend service for providing an end user service and for enacting an end user data deletion request for an end user, the backend service entity comprising:

a memory storing computer readable code; and a processor operatively coupled to the memory, the processor configured to:

receive from a privacy broker system a prepare for deletion message relating to the end user data deletion request, wherein the prepare for deletion message comprises enabling data for enabling the obtaining of a privacy event;

prepare to enact the end user data deletion request by gathering data as gathered data relating to the end user that are to be retained, and storing or archiving the gathered data that are to be retained;

after preparations for enacting the end user data deletion request are complete, communicate a ready for deletion message to the privacy broker system; and after receipt of a deletion message from the privacy broker system, enact the end user data deletion request.

13. The two step deletion subscriber entity of claim 12, wherein preparing to enact the end user data deletion request comprises gathering data relating to the end user that are to be retained, and wherein the backend service entity is further configured to:

store the gathered data that are to be retained.

14. The two step deletion subscriber entity of claim 13, wherein gathering data relating to the end user that are to be retained comprises:

gathering data from one or more related backend services.

15. The two-step deletion subscriber entity of claim 13, wherein the backend service entity comprises data retention settings indicative of types of end user data that are to be retained, and wherein preparing to enact the end user data deletion request is based at least in part on the data retention settings.

* * * * *